(12) United States Patent
Kabune

(10) Patent No.: US 10,424,994 B2
(45) Date of Patent: Sep. 24, 2019

(54) DRIVE DEVICE AND ELECTRIC POWER STEERING DEVICE INCLUDING THE DRIVE DEVICE

(71) Applicant: DENSO CORPORATION, Kariya, Aichi-pref. (JP)

(72) Inventor: Hideki Kabune, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/002,239

(22) Filed: Jun. 7, 2018

(65) Prior Publication Data

US 2018/0287462 A1    Oct. 4, 2018

Related U.S. Application Data

(63) Continuation of application No. 14/812,753, filed on Jul. 29, 2015, now Pat. No. 10,050,493.

(30) Foreign Application Priority Data

Jul. 31, 2014    (JP) ................... 2014-156485

(51) Int. Cl.
*H02P 25/00*    (2006.01)
*H02K 9/00*    (2006.01)
(Continued)

(52) U.S. Cl.
CPC ............. *H02K 9/00* (2013.01); *B62D 5/0406* (2013.01); *B62D 5/0412* (2013.01);
(Continued)

(58) Field of Classification Search
CPC .......... H02K 9/00; H02K 11/33; H02K 11/30; H02K 9/22; H02K 5/1732; H02K 5/225;
(Continued)

(56) References Cited

U.S. PATENT DOCUMENTS

| 4,668,898 A | 5/1987 | Harms |
| 6,175,171 B1 | 1/2001 | Rupp |

(Continued)

FOREIGN PATENT DOCUMENTS

| JP | 2003-153552 | 5/2003 |
| JP | 2006-280089 A | 10/2006 |

(Continued)

OTHER PUBLICATIONS

U.S. Appl. No. 14/812,415, filed Jul. 29, 2015, Yamasaki, et al.
(Continued)

*Primary Examiner* — Eduardo Colon Santana
*Assistant Examiner* — Gabriel Agared
(74) *Attorney, Agent, or Firm* — Knobbe, Martens, Olson & Bear, LLP

(57) ABSTRACT

A drive device that includes a rotating electric machine having a stator with a winding wound on the stator, a rotor rotatably disposed relative to the stator, and a shaft rotating together with the rotor. The drive device also includes a frame member fixed on the rotating electric machine. The drive device further includes a circuit board fixed on the frame member, with a first surface of the circuit board on a frame member side serving as a heat generation element mount surface. The drive device also has a drive element located on the first surface of the circuit board in a heat dissipatable manner, and serving as a component of an inverter that switches on and off to supply an electric current to the winding.

6 Claims, 19 Drawing Sheets

(51) Int. Cl.
    *B62D 5/04*     (2006.01)
    *H02K 11/33*     (2016.01)
    *H02K 11/21*     (2016.01)
    *H02K 11/30*     (2016.01)
    *H02K 5/173*     (2006.01)
    *H02K 5/22*     (2006.01)
    *H02K 9/22*     (2006.01)

(52) U.S. Cl.
    CPC ........... B62D 5/0463 (2013.01); H02K 11/21 (2016.01); H02K 11/30 (2016.01); H02K 11/33 (2016.01); *H02K 5/1732* (2013.01); *H02K 5/225* (2013.01); *H02K 9/22* (2013.01)

(58) Field of Classification Search
    CPC ... B62D 5/0463; B62D 5/0406; B62D 5/0412
    USPC ........................................................ 318/720
    See application file for complete search history.

(56) References Cited

U.S. PATENT DOCUMENTS

| | | | |
|---|---|---|---|
| 6,577,030 | B2 | 6/2003 | Tominaga |
| 6,949,849 | B1 | 9/2005 | Wright |
| 7,445,081 | B2 | 11/2008 | Tominaga |
| 7,635,046 | B2 | 12/2009 | Tominaga |
| 8,007,255 | B2 | 8/2011 | Hattori |
| 8,063,594 | B2 | 11/2011 | Motoda |
| 9,270,145 | B2 | 2/2016 | Asao |
| 9,359,004 | B2 | 6/2016 | Kawata |
| 9,457,835 | B2 | 10/2016 | Yamasaki |
| 9,473,004 | B2 | 10/2016 | Kadoike |
| 9,479,025 | B2 | 10/2016 | Kawata |
| 9,692,350 | B2 | 6/2017 | Yamasaki |
| 2008/0224553 | A1* | 9/2008 | Abe ........................ H02K 5/15 310/71 |
| 2009/0155101 | A1 | 6/2009 | Fukasaku et al. |
| 2010/0327677 | A1 | 12/2010 | Iwai et al. |
| 2011/0018374 | A1 | 1/2011 | Yamasaki et al. |
| 2011/0031851 | A1 | 2/2011 | Uryu et al. |
| 2011/0254387 | A1 | 10/2011 | Matsuda |
| 2012/0098361 | A1 | 4/2012 | Yamasaki et al. |
| 2012/0229005 | A1 | 9/2012 | Tominaga |
| 2012/0286604 | A1* | 11/2012 | Abe ........................ H02K 11/33 310/71 |
| 2012/0286630 | A1* | 11/2012 | Tomizawa ............. H02K 5/225 310/68 D |
| 2013/0187517 | A1 | 7/2013 | Asao |
| 2013/0249356 | A1* | 9/2013 | Nakano ................... H02K 5/24 310/68 D |
| 2013/0257232 | A1 | 10/2013 | Tomizawa et al. |
| 2013/0258879 | A1 | 10/2013 | Soumiya et al. |
| 2014/0125173 | A1 | 5/2014 | Hayashi |
| 2014/0265748 | A1 | 9/2014 | Clendenen |
| 2014/0339966 | A1* | 11/2014 | Tomizawa ............... H02K 5/22 310/68 D |
| 2015/0171709 | A1 | 6/2015 | Ito et al. |
| 2015/0216083 | A1 | 7/2015 | Kanazawa |
| 2016/0006322 | A1 | 1/2016 | De Filippis |
| 2016/0036288 | A1 | 2/2016 | Yamasaki |
| 2016/0036296 | A1 | 2/2016 | Kabune |
| 2016/0036371 | A1 | 2/2016 | Yamasaki |
| 2016/0174393 | A1 | 6/2016 | Asao |

FOREIGN PATENT DOCUMENTS

| | | |
|---|---|---|
| JP | 2008-263755 A | 10/2008 |
| JP | 2009-142123 A | 6/2009 |
| JP | 2009-248864 | 10/2009 |
| JP | 2010-104212 | 5/2010 |
| JP | 2012-110176 | 6/2012 |
| JP | 2012-197051 | 10/2012 |
| JP | 2013-062959 A | 4/2013 |
| JP | 2013-090377 | 5/2013 |
| JP | 5414869 | 2/2014 |
| JP | 2015-089298 | 5/2015 |

OTHER PUBLICATIONS

U.S. Appl. No. 14/812,757, filed Jul. 29, 2015, Yamasaki, et al.
U.S. Appl. No. 14/812,886, filed Jul. 29, 2015, Yamasaki.
U.S. Appl. No. 14/812,866, filed Jul. 29, 2015, Kawata, et al.
U.S. Appl. No. 14/812,807, filed Jul. 29, 2015, Kawata, et al.
U.S. Appl. No. 14/812,769, filed Jul. 29, 2015, Kadoike, et al.
U.S. Appl. No. 14/812,733, filed Jul. 29, 2015, Kamasaki, et al.
U.S. Appl. No. 14/812,767, filed Jul. 29, 2015, Hayashi.

* cited by examiner

DRIVE DEVICE AND ELECTRIC POWER STEERING DEVICE INCLUDING THE DRIVE DEVICE

CROSS REFERENCE TO RELATED APPLICATION

The present application is continuation application of U.S. application Ser. No. 14/812,753, filed on Jul. 29, 2015, which is based on and claims the benefit of priority from Japanese Patent Application No. 2014-156485, filed on Jul. 31, 2014, the disclosures of which are incorporated herein by reference.

TECHNICAL FIELD

The present disclosure generally relates to a drive device and an electric power steering device including drive device.

BACKGROUND INFORMATION

Conventionally, a motor and an inverter for controlling a drive of the motor are disposed at positions close to each other. For example, a patent document, Japanese Patent Laid-Open No. 2003-153552 (Patent document 1) discloses a structure in which an inverter-mounted circuit board is housed in a case, and the case is attached to an outer shell of a compressor.

The structure in the patent document 1 has a heat sink disposed on an opening of the case, and heat from an Intelligent Power Module (IPM) is dissipated to the heat sink. Therefore, the structure in the patent document 1 needs to have an opening on the case, and the heat sink must be provided in a separate part from the other part, which increases the number of components in the drive device.

SUMMARY

It is an object of the present disclosure to provide a drive device and an electric power steering including the drive device, which uses a fewer number of components than the conventional drive devices.

The drive device of the present disclosure includes a rotating electric machine having a stator with a winding wound on the stator, a rotor rotatably disposed relative to the stator, and a shaft rotating together with the rotor. The drive device also includes a frame member fixed on the rotating electric machine. The drive device further includes a circuit board fixed on the frame member, with a first surface of the circuit board on a frame member side serving as a heat generation element mount surface.

The drive device also has a drive element located on the first surface of the circuit board in a heat dissipatable manner, and serving as a component of an inverter that switches on and off to supply an electric current to the winding. The drive device further includes a controller component including at least one of a calculation circuit performing a calculation process, a pre-driver outputting a drive signal to the drive element, a regulator adjusting a voltage of a power source and outputting the adjusted voltage, a signal processor processing an input signal, and a rotational angle sensor detecting a rotation angle of the rotor, the controller component being mounted on a same circuit board as the drive element.

In the present disclosure, the drive element is disposed on the frame member, on which the circuit board is fixed, in a heat dissipatable manner. Therefore, the number of components is reduced in comparison to a structure in which the heat sink and other devices are separately disposed for dissipating heat from the drive element.

Further, in the present disclosure, the drive element and the controller component share the same circuit board, i.e., are disposed on the same board. Therefore, the mount surface of the circuit board is efficiently utilized, for the reduction of the product volume. Specifically, by mounting all controller components on the same circuit board as the drive element, the number of the components (i.e., the number of the circuit boards) is reduced in comparison to the structure in which two or more circuit boards are used, and achieving a smaller product volume.

Further, the drive device is suitably used in an electric power steering device. The electric power steering device includes the drive device and a gear that transmits an output torque of the rotating electric machine to a drive object, e.g., a rack shaft of the power steering, for assisting a steering operation of a driver for steering a steering member (i.e., a steering wheel).

The drive device of the present disclosure has a smaller product volume by mounting the drive element and the controller components on the same circuit board and by dissipating heat therefrom to the frame member. Therefore, the drive device is installable in a small installation space.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive device in the present disclosure and the electric power steering are described with reference to the drawings.

(First Embodiment)

The drive device in the first embodiment of the present disclosure and the electric power steering device are shown in FIGS. 1-11. Hereafter, in all embodiments described in the following, the same numerals represent the same parts, for the brevity of the description.

Figure 1:
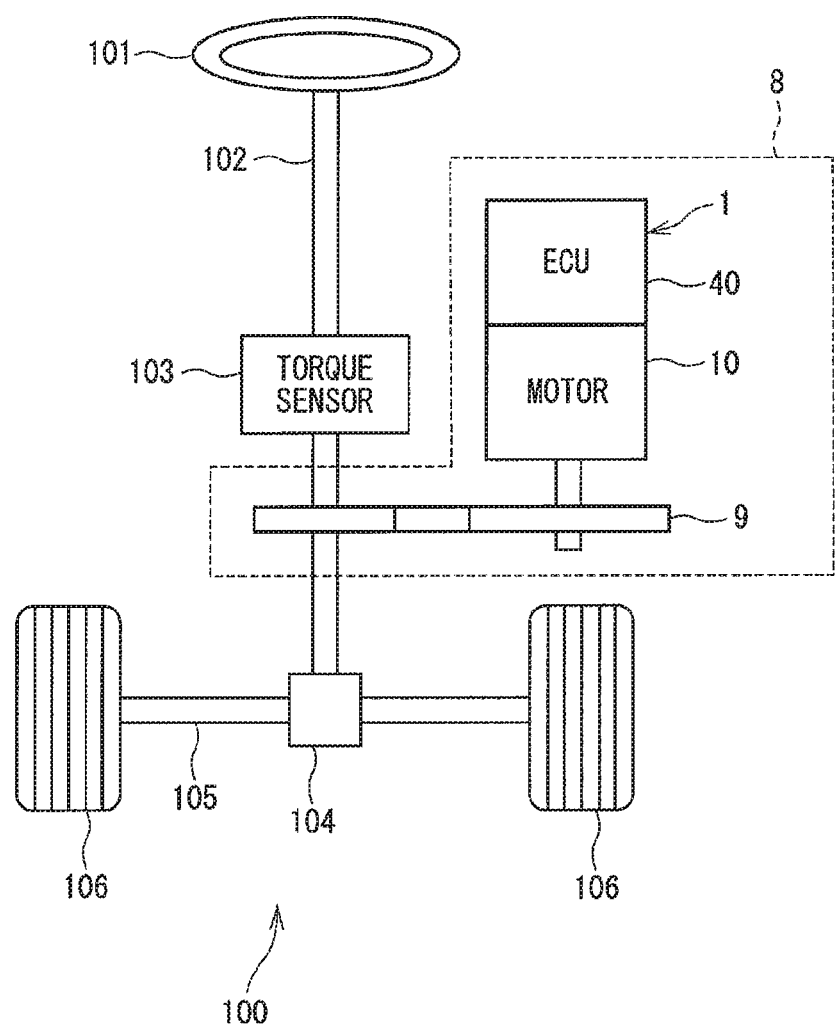
FIG. 1 is a system diagram of an electric power steering in a first embodiment of the present disclosure.

As shown in FIG. 1, a drive device 1 is applied to an electric power steering device 8 for assisting the steering operation by the driver. The drive device 1 is a one-body combination of a motor 10 serving as a rotating electric machine and an ECU 40 serving as a controller for controlling the motor 10.

FIG. 1 shows a system diagram of a steering system 100 having the electric power steering device 8. The steering system 100 comprises a steering wheel 101, a column shaft 102, a pinion gear 104, a rack shaft 105, wheels 106, and the electric power steering device 8 etc. respectively serving as a component of the system.

The steering wheel 101 is connected to the column shaft 102. The column shaft 102 has a torque sensor 103 disposed thereon, which is used for detecting a steering torque which is input thereto when the driver operates the steering wheel 101. At a tip of the column shaft 102, the pinion gear 104 is disposed, which is engaged with the rack shaft 105. On both ends of the rack shaft 105, a pair of wheels 106 is disposed via a tie rod and the like.

Thereby, when the driver rotates the steering wheel 101, the column shaft 102 connected to the steering wheel 101 rotates. The rotational movement of the column shaft 102 is turned into a translational movement of the rack shaft 105 by the pinion gear 104, and the pair of wheels 106 is steered by an angle according to an amount of displacement of the rack shaft 105.

The electric power steering device 8 is provided with a speed reduction gear 9 and the drive device 1. The electric power steering device 8 outputs the assisting torque from the motor 10 based on the signals from the torque sensor 103 and the vehicle speed obtained from a Controller Area Network (CAN) (not illustrated), and transmits the torque to the column shaft 102 via the speed reduction gear 9, for assisting the steering operation of the steering wheel 101. That is, the electric power steering device 8 of the present embodiment is what is designated as a "column assistance" type, which assists a rotation of the column shaft 102 with the torque generated by the motor 10. However, the device 8 may also be used as a "rack assistance" type, which assists the drive of the rack shaft 105. In other words, the column shaft 102 serving as "a drive object" in the present embodiment may be replaced with other objects, e.g., with the rack shaft 105.

Figure 2:
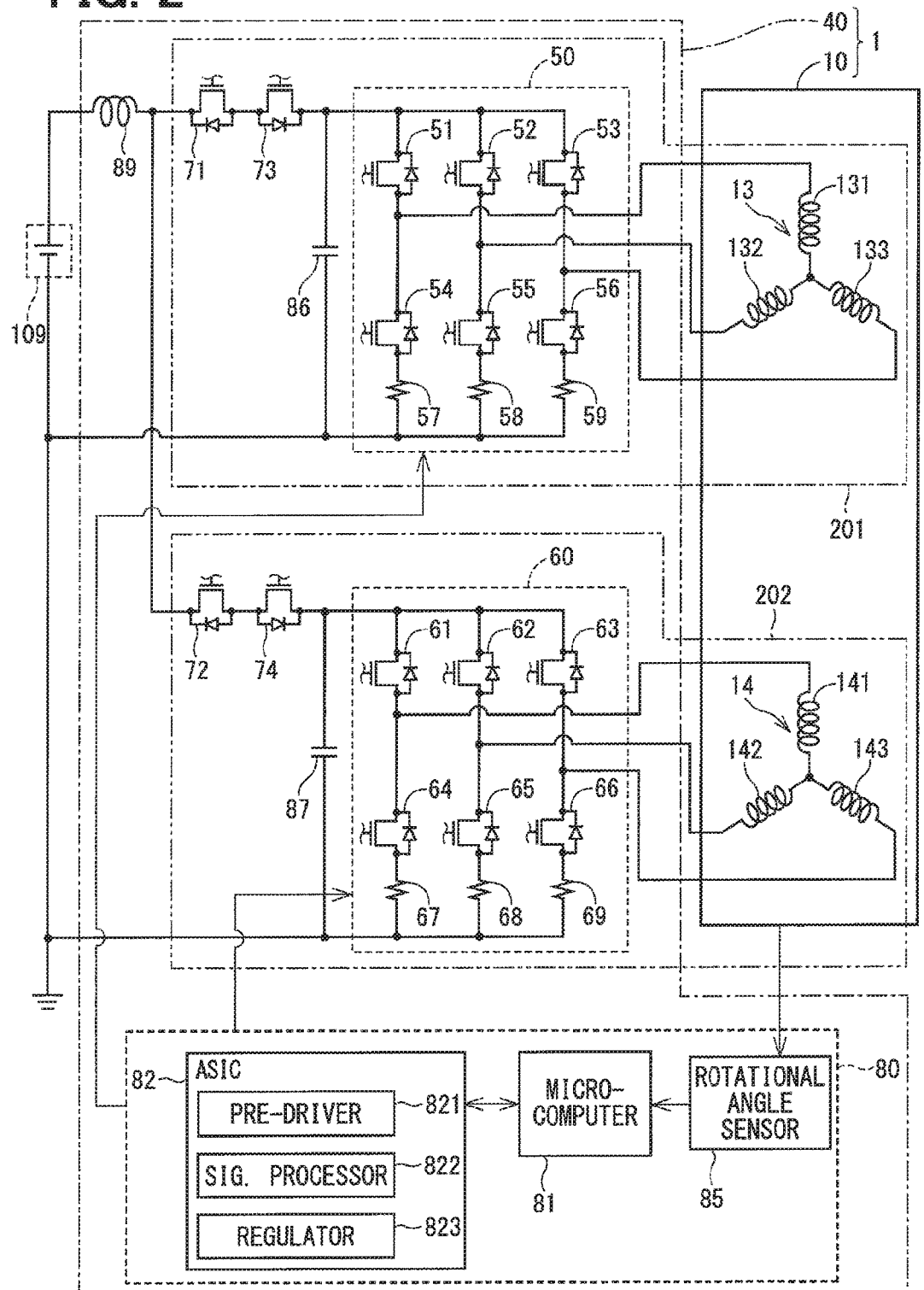
FIG. 2 is a schematic diagram of a circuit configuration of a drive device in the first embodiment of the present disclosure.

Next, the electrical configuration of the electric power steering device 8 is described based on FIG. 2. In FIG. 2, for the readability of the drawing, some control lines etc. are omitted therefrom.

The motor 10 is a three-phase brushless motor, and has a first winding group 13 and a second winding group 14 respectively wound on a stator 12 which are mentioned later.

The first winding group 13 comprises a U phase coil 131, a V phase coil 132, and a W phase coil 133. The second winding group 14 comprises a U phase coil 141, a V phase coil 142, and a W phase coil 143.

According to the present embodiment, the first winding group 13 and the second winding group 14 respectively correspond to a "winding," or "winding wire."

The ECU 40 is provided with a first inverter part 50, a second inverter part 60, power relays 71 and 72, reverse connection protection relays 73 and 74, a controller component 80, a rotational angle sensor 85, capacitors 86 and 87, and a choke coil 89 serving as a coil member, which are respectively mounted on a circuit board 41 mentioned below. In the present embodiment, the electronic components that constitute the ECU 40 are mounted on one circuit board 41. In such configuration, the number of circuit boards in the ECU 40 is reduced in comparison to a case where plural circuit boards 41 are used, thereby reducing the volume of the ECU 40.

The first inverter part 50 has six switching elements (SW elements) 51-56 combined in a bridge connection form, for the switching of the power supply to the first winding group 13. The second inverter part 60 has six SW elements 61-66 in a bridge connection form, for the switching of the power supply to the second winding group 14.

Although the SW elements 51-56, 61-66 of the present embodiment are Metal Oxide Semiconductor Field Effect Transistor (MOSFET), other elements such as Insulated Gate Bipolar Transistor (IGBT) and the like may also be used. In the present embodiment, the SW elements 51-56, 61-66 correspond to a "drive element."

As for the SW elements 51, 52, and 53 arranged on the high potential side of the first inverter part 50, the drain is connected to a positive electrode of a battery 109 that serves as a power supply, and the source is connected to the drain of the SW elements 54, 55, and 56 arranged on the low potential side.

The source of the SW elements 54, 55, and 56 is connected to a negative electrode of the battery 109 via current detection elements 57, 58, and 59. The junction points between the SW elements 51, 52, 53 on the high potential side and the SW elements 54, 55, 56 on the low potential side are connected to the U phase coil 131, the V phase coil 132, and the W phase coil 133, respectively.

As for the SW elements 61, 62, and 63 arranged on the high potential side of the second inverter part 60, the drain is connected to the positive electrode of the battery 109, and the source is connected to the drain of the SW elements 64, 65, and 66 arranged on the low potential side.

The source of the SW elements 64, 65, 66 is connected to the negative electrode of the battery 109 via current detection elements 67, 68, and 69. The junction points between the SW elements 61, 62, 63 on the high potential side and the SW elements 64, 65, 66 on the low potential side are connected to the U phase coil 141, the V phase coil 142, and the W phase coil 143, respectively.

The current detection elements 57, 58, and 59 are disposed on the low potential side of the SW elements 54-56 respectively corresponding to the three phases of the first winding group 13, for detecting the electric current in each of the three phases of the first winding group 13.

The current detection elements 67, 68, and 69 are disposed on the low potential side of the SW elements 64-66 respectively corresponding to the three phases of the second winding group 14, for detecting the electric current in each of the three phases of the second winding group 14.

The current detection elements 57-59, 67-69 of the present embodiment are implemented as shunt resistors.

The power relay 71 is disposed at a position between the battery 109 and the first inverter part 50, and conducts or intercepts the electric current between the battery 109 and the first inverter part 50.

The power relay 72 is disposed at a position between the battery 109 and the second inverter part 60, and conducts or intercepts the electric current between the battery 109 and the second inverter part 60.

The reverse connection protection relay 73 is disposed at a position between the power relay 71 and the first inverter part 50. The reverse connection protection relay 74 is disposed at a position between the power relay 72 and the second inverter part 60.

The reverse connection protection relays 73 and 74 prevent the electric current flowing in a reverse direction for the protection of the ECU 40, (e.g., in case the battery 109 is connected in reverse) by having a parasitic diode connected in reverse relative to the power relays 71, 72.

In the present embodiment, the power relays 71, 72 and the reverse connection protection relays 73, 74 are all MOSFETS. However, other semiconductor elements such as IGBT and the like may also be used as those relays. In the present embodiment, the power relays 71, 72 and the reverse connection protection relays 73, 74 correspond to a "relay."

The controller component 80 includes a microcomputer 81, which serves as an electronic component and a calculation circuit, and an Application Specific Integrated Circuit (ASIC) 82, which serves as an Integrated Circuit (IC circuit), and a rotational angle sensor 85. The microcomputer 81 and the ASIC 82 correspond to an "integrated circuit component".

The microcomputer 81 calculates an instruction value concerning the power supply to the first winding group 13 and the second winding group 14 based on the signal from the torque sensor 103, the rotational angle sensor 85 and the like.

The ASIC 82 comprises a pre-driver 821, a signal processor 822, a regulator 823, and the like.

The pre-driver 821 generates a driving signal based on the instruction value, and outputs the generated driving signal to the first inverter part 50 and to the second inverter part 60. More practically, the pre-driver 821 outputs the generated driving signal to the gate of the SW elements 51-56, 61-66. By the switching operation of the SW elements 51-56, 61-66 according to the driving signal, an AC current according to the instruction value is supplied to the first winding group 13 and to the second winding group 14 from the first inverter part 50 and the second inverter part 60, respectively. Thereby, the motor 10 is driven.

The signal processor 822 amplifies the detection signal (i.e., a voltage between both terminals in the present embodiment) of the current detection elements 57-59, 67-69, and the detection value of the rotational angle sensor 85, and outputs them to the microcomputer 81.

The regulator 823 adjusts a voltage of the power source (e.g., 12 [V]) to a preset voltage (e.g., 5 [V]), and outputs the adjusted voltage to the microcomputer 81 or the like. In other words, the regulator 823 is a stabilization circuit which stabilizes the voltage supplied to the microcomputer 81 and the like.

The rotational angle sensor 85 is provided as a magnetism detection element, and detects a rotation angle of a rotor 15 by detecting a rotating magnetic field from a magnet 18 provided on an other end 162 of a shaft 16 mentioned later. The rotational angle sensor 85 may detect an electric angle, or may detect a mechanical angle.

The capacitor 86 is connected in parallel with the first inverter part 50. The capacitor 87 is connected in parallel with the second inverter part 60. In the present embodiment, the capacitors 86 and 87 are the aluminum electrolytic capacitors, and are disposed on the inverter side (i.e., on one side close to the inverter parts 50, 60) of the relays 71-74. The choke coil 89 is connected at a position between the battery 109 and the positive electrodes of the capacitors 86 and 87. In the present embodiment, the choke coil 89 is disposed on the battery side (i.e., on one side close to the battery 109) of the relays 71-74.

The capacitors 86 and 87 and the choke coil 89 serve as a filter circuit, reducing the noise transmitted from the drive device 1 to the other devices that share the power supply from the battery 109 with the drive device 1, and also reducing the noise transmitted from the other devices sharing the battery 109 back to the drive device 1. The capacitors 86 and 87 store the electric charge, and support the electric power supply to the first inverter part 50 and the second inverter part 60.

In the present embodiment, the first inverter part 50, the power relay 71, the reverse connection protection relay 73, and the capacitor 86 are grouped as a first system 201, corresponding to the first winding group 13. Further, the second inverter part 60, the power relay 72, the reverse connection protection relay 74, and the capacitor 87 are grouped as a second system 202, corresponding to the second winding group 14. That is, a drive control of the motor 10 is performed in plural systems, (i.e., in two systems in the present embodiment).

Figure 3:
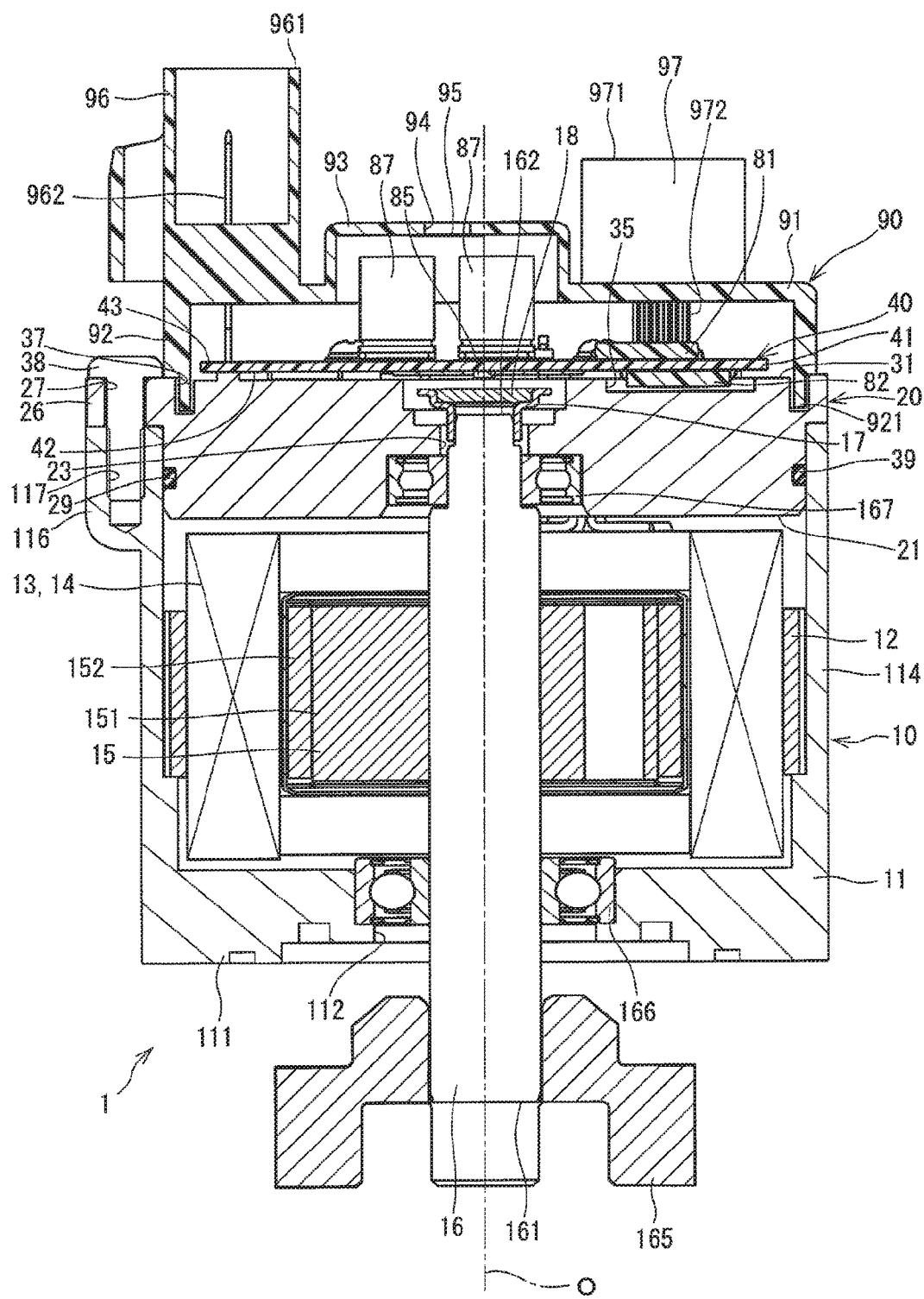
FIG. 3 is a sectional view of the drive device in the first embodiment of the present disclosure.
Figure 4:
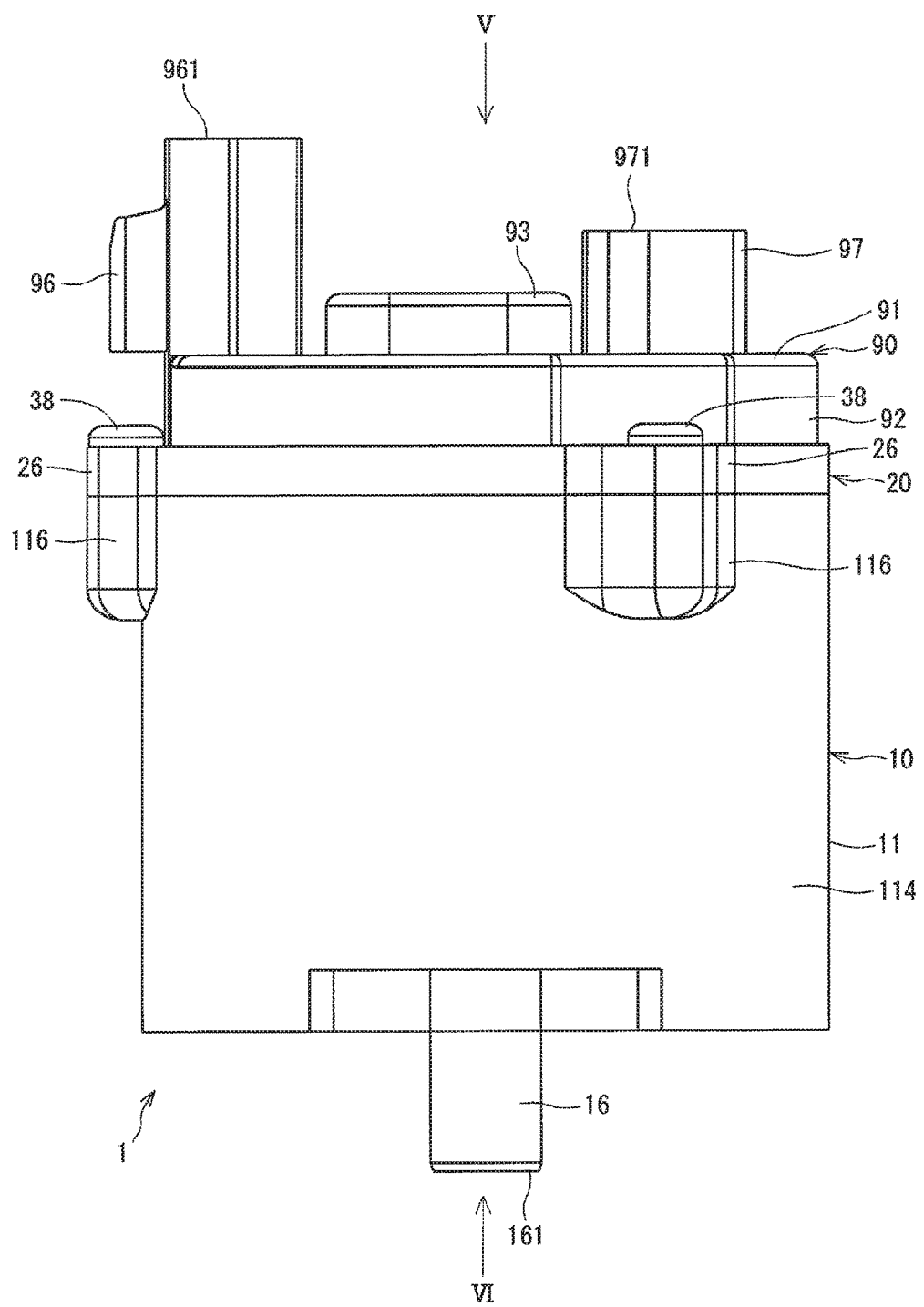
FIG. 4 is a side view of the drive device in the first embodiment of the present disclosure.
Figure 5:
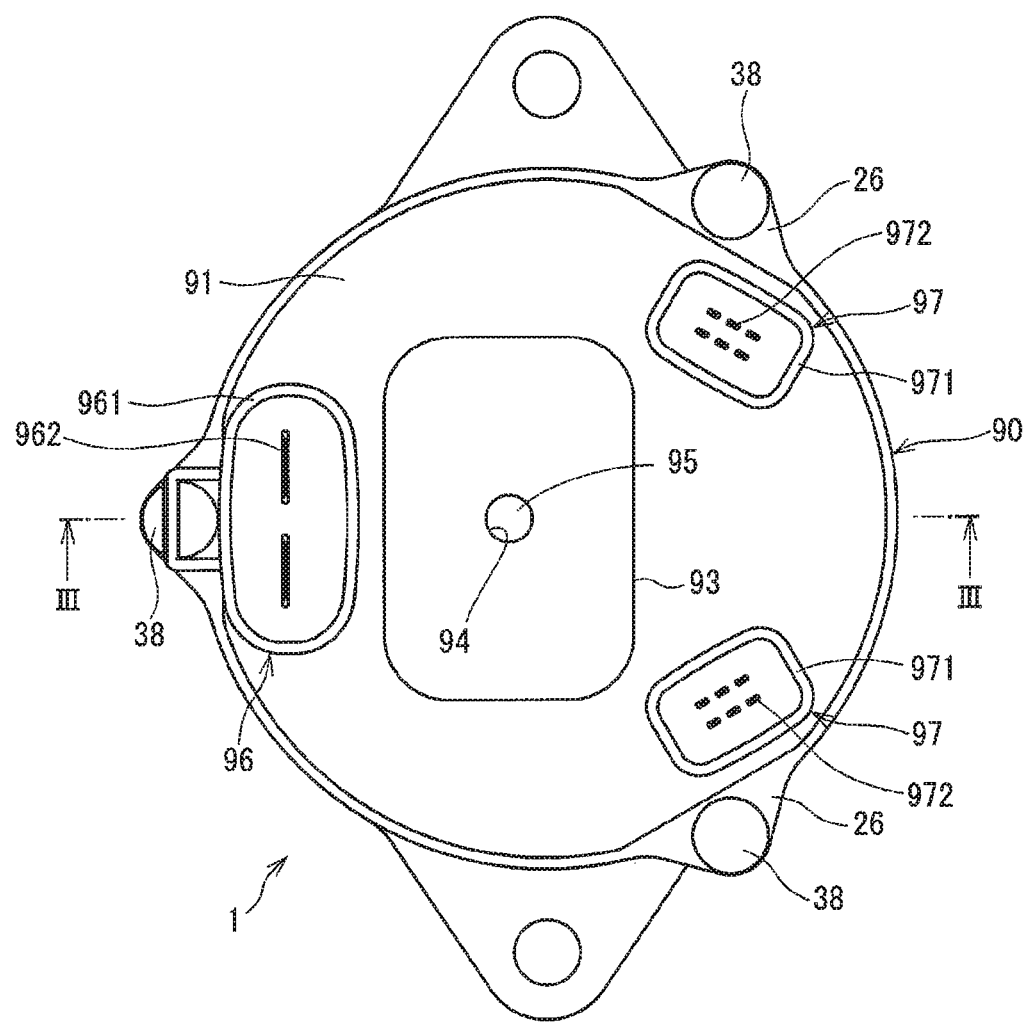
FIG. 5 is a top view of the drive device along an arrow V in FIG. 4.
Figure 6:
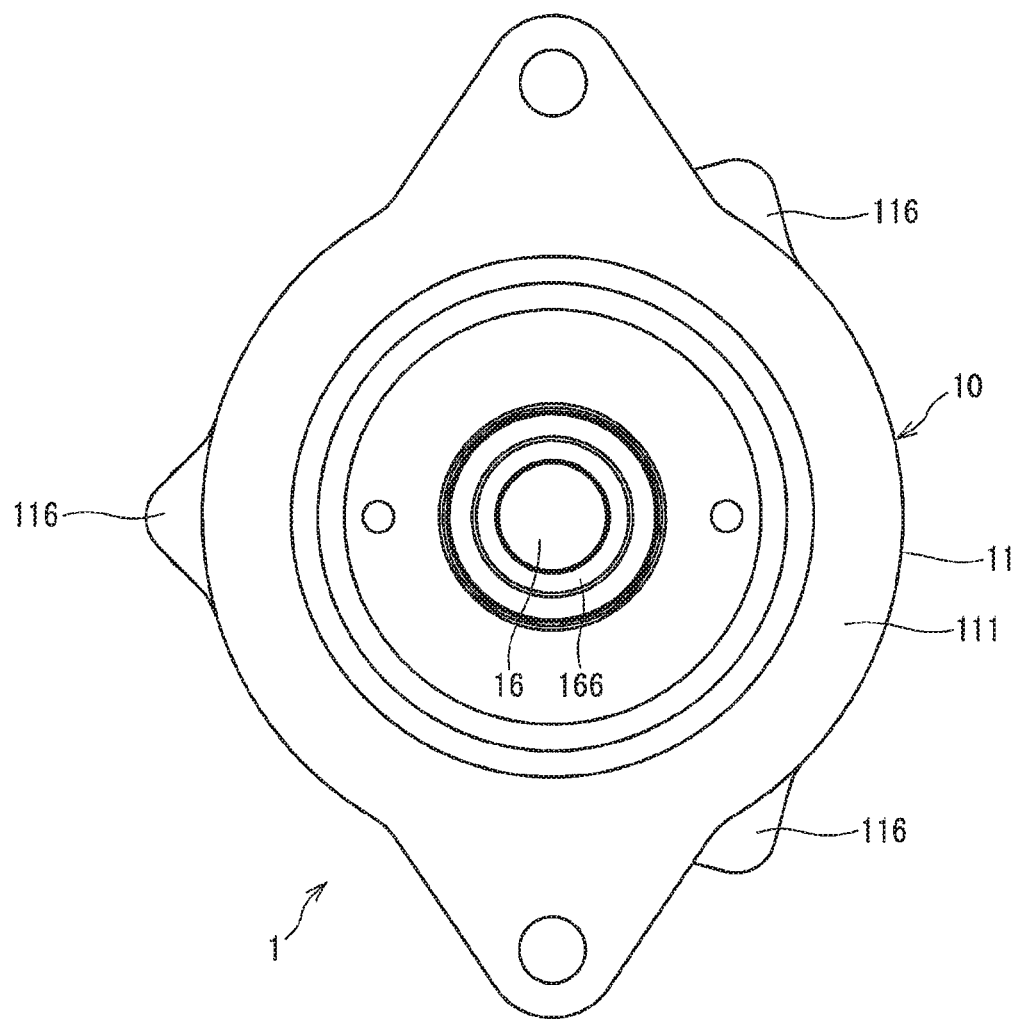
FIG. 6 is a bottom view of the drive device along an arrow VI in FIG. 4.

Next, a structure of the drive device 1 is described based on FIGS. 3-11. In the following, an axial direction of the motor 10 may simply be designated as an "axial direction," and a radius direction of the motor 10 may simply be designated as a "radius direction." FIG. 3 is a sectional view along a III-III line of FIG. 5.

As shown in FIGS. 3-8, the drive device 1 is provided with the motor 10, a frame member 20, the ECU 40, and a cover member 90, together with other parts.

As shown in FIG. 3, the motor 10 has a motor case 11, a stator 12, the first winding group 13, the second winding group 14, a rotor 15, a shaft 16, and other parts.

The motor case 11 has a bottom part 111 and a cylinder part 114, for example, is formed in a cylinder shape closed on one end, i.e., having a bottom on one end, and is made from metal, such as aluminum. The motor case 11 of the present embodiment is made from aluminum, and, as for the surface of the case 11, the anodized aluminum treatment is performed. The bottom part 111 of the motor case 11 is positioned away from the ECU 40, i.e., on an opposite side, and an opening of the motor case 11 is close to the ECU 40, i.e., on the ECU side. In the present embodiment, the cylinder part 114 corresponds to a "cylinder part of the rotating electric machine," and a projection area of the cylinder part 114 projected along the axial direction corresponds to a "motor region".

A shaft hole 112 into which one end 161 of the shaft 16 is inserted is disposed substantially at the center of the bottom part 111. Further, a bearing 166 is attached to the bottom part 111.

On or around the opening of the cylinder part 114, a fixing tab 116 for fixedly disposing the frame member 20 is formed (i.e., projecting radially outward from an outer wall of the cylinder part 114). The fixing tab 116 has a screw-threaded hole 117 bored thereon. The fixing tab 116 of the present embodiment is disposed at three positions around the cylinder part 114 at the same interval.

The stator 12 has a layered part, (i.e., a layered structure) of a magnetizable thin metal such as iron, and an insulator disposed on a radial outside of the layered part, and the stator 12 is fixedly disposed in an inside of the motor case 11. The number of sheets of the thin metal in the layered part of the stator 12 may be changed according to the output required for the motor 10. Thereby, the output of the motor 10 can be changed by changing the axial length of the stator 12, without changing the radius length of the motor 10.

The first winding group 13 and the second winding group 14 are wound on the insulator of the stator 12. For each of the three phases, a first motor line 135 is taken out from the first winding group 13, and for each of the three phases, a second motor line 145 is taken out from the second winding group 14. The motor lines 135 and 145 are taken out (i.e., extend) from the motor case 11 toward the ECU 40 (see FIG. 7).

The first motor line 135 includes a first U phase motor line 136 and a first V phase motor line 137 and a first W phase motor line 138, and the three lines 136, 137, 138 are positioned away in a numeral ascending order from the power relays 71 and 72.

The second motor line 145 includes a second U phase motor line 146 and a second V phase motor line 147 and a second W phase motor line 148, and the three lines 146, 147, 148 are positioned away in a numeral descending order from the power relays 71 and 72.

The first U phase motor line 136 and the second U phase motor line 146, and the first V phase motor line 137 and the second V phase motor line 147, and the first W phase motor line 138 and the second W phase motor line 148 are respectively arranged at point-symmetric positions around a center axis O of the motor 10 which is a virtual extension line of the shaft 16. Further, the first U phase motor line 136 and the first W phase motor line 138 are symmetric against the first V phase motor line 137. Similarly, the second U phase motor line 146 and the second W phase motor line 148 are symmetrically positioned against the second V phase motor line 147.

Thereby, the magnetic flux leakage from the first motor line 135 and the magnetic flux leakage from second the second motor line 145 cancel with each other. Further, the influence of the magnetic flux leakage on the rotational angle sensor 85 that is mounted at a position on the center axis O of the motor 10 is reduced in such configuration, thereby reducing the detection error of the sensor 85.

Here, "symmetry" means a substantially-symmetric arrangement of those lines, for the cancellation of the magnetic flux leakage, allowing a dimension error in the actual product.

The rotor 15 has a rotor core 151 and a permanent magnet 152. The rotor core 151 is formed in an approximately cylindrical shape, for example, and is made from a magnetic material, (e.g. iron) and is coaxially arranged in an inside of the stator 12, (i.e., in a radius inside of the stator 12).

The permanent magnet 152 is disposed on a radius outside of the rotor core 151, and the N poles and the S poles of the rotor core 151 alternate with each other.

The shaft 16 is formed in a rod shape, for example, with metal, and is attached at the center position (i.e., on a rotation axis of the rotor core 151). The shaft 16 is rotatably supported by the bearing 166 attached on the bottom part 111 of the motor case 11 and by a bearing 167 attached on the frame member 20. Thereby, the shaft 16 is rotatable with the rotor 15. Further, an outer wall of the rotor 15 and an inner wall of the stator 12 are interposed with an air gap.

The one end 161 of the shaft 16 is inserted into the shaft hole 112 that is bored on the bottom part 111 of the motor case 11, and projects toward an outside of the motor case 11. The one end 161 of the shaft 16 serves as an output end 165, which is connected to the speed reduction gear 9, for outputting the torque from the motor 10 toward the column shaft 102 via the speed reduction gear 9 (see FIG. 1).

The other end 162 of the shaft 16 has a magnet holder part 17 that holds the magnet 18.

Figure 7:
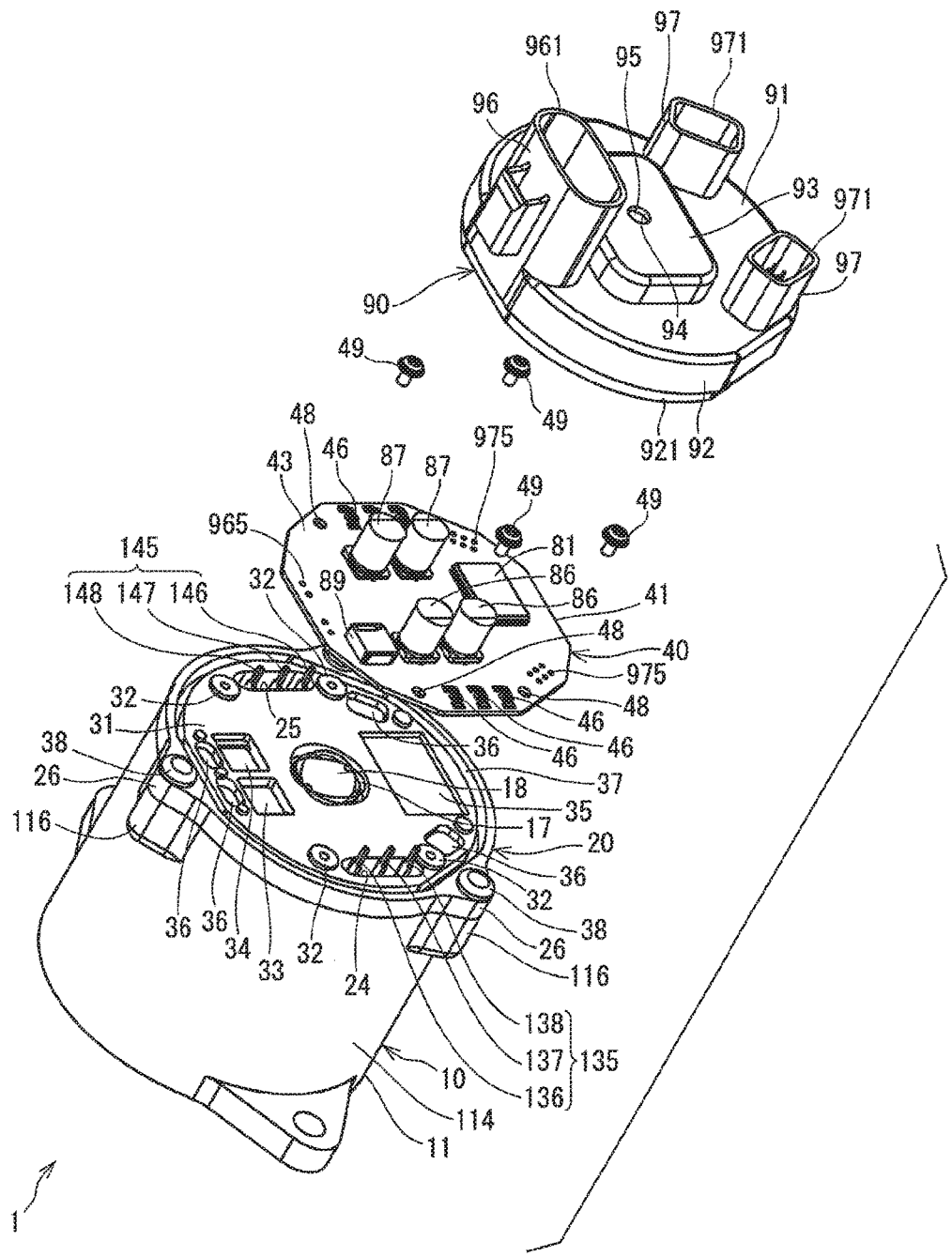
FIG. 7 is an exploded perspective view of the drive device in the first embodiment of the present disclosure.

As shown in FIG. 3 and FIG. 7, for example, the frame member 20 made from highly-heat-conductive metal, such as aluminum or the like, is formed in a lid shape for closing the opening of the motor case 11 (i.e., is inserted into a radial inside of the cylinder part 114). Here, one side of the frame member 20 close to the motor 10 is designated as a motor side face 21, and the other side of the frame member 20 away from the motor 10 and close to the ECU 40 is designated as an ECU side face 31.

A shaft hole 23 is bored substantially at the center of the frame member 20 along the axial direction. The other end 162 of the shaft 16 is inserted into the shaft hole 23. Thereby, the magnet 18 disposed on the other end 162 of the shaft 16 is exposed to (i.e., faces) the ECU 40. The bearing 167 is attached on the frame member 20.

Further, the frame member 20 has a motor line insertion hole 24 into which the first motor line 135 is inserted and a motor line insertion hole 25 into which the second motor line 145 is inserted. Thereby, the motor lines 135 and 145 are taken out therefrom to extend toward the ECU 40.

The frame member 20 has a fixing tab 26 which projects outward in a radius direction at corresponding positions (i.e., three positions in the present embodiment) corresponding to the fixing tab 116 of the motor case 11. The fixing tab 26 has a through hole 27 bored thereon. A frame lockscrew 38 is inserted into the through hole 27, and is tightly screwed into the screw-threaded hole 117. Thereby, the frame member 20 is fixed onto the motor case 11.

At an outer periphery of the frame member 20 and around the motor side face 21 which is close to the bottom part 111 than the fixing tab 26, an O ring groove 29 is provided, into which an O ring 39 is inserted, and the O ring 39 bound by the O ring groove 29 and the cylinder part 114 provides a watertight structure. Thereby, water and the like are prevented from intruding into the motor 10 via a position between the motor case 11 and the frame member 20.

The ECU side face 31 of the frame member 20 has a circuit board fixing tab 32, relay rooms 33 and 34, an ASIC room 35, a terminal receptacle groove 36, and an adhesion groove 37.

As shown in FIGS. 3, 7-11, the ECU 40 is disposed away from the motor 10 relative to the frame member 20 (i.e., with the frame member 20 interposed therebetween). The ECU 40 is positioned substantially within the motor region, and is substantially coaxially disposed with the motor 10.

The ECU 40 has a circuit board 41 on which many electronic components are mounted.

The circuit board 41 is formed in a shape that fits into the motor region. In the present embodiment, more practically, the circuit board 41 is contained within the groove region (i.e., in a radius inside of the adhesion groove 37) provided on the ECU side face 31 of the frame member 20. In other words, the ECU components on the circuit board 41, such as the SW elements 51-56, 61-66, the current detection elements 57-59, 67-69, the capacitors 86, 87, and the choke coil 89, are positioned within the motor region.

Here, one side of the circuit board 41 close to the motor 10 is designated as a heat generation element mount surface 42, and the other side, a surface away from the motor 10, is designated as a large-size component mount surface 43.

Figure 8:
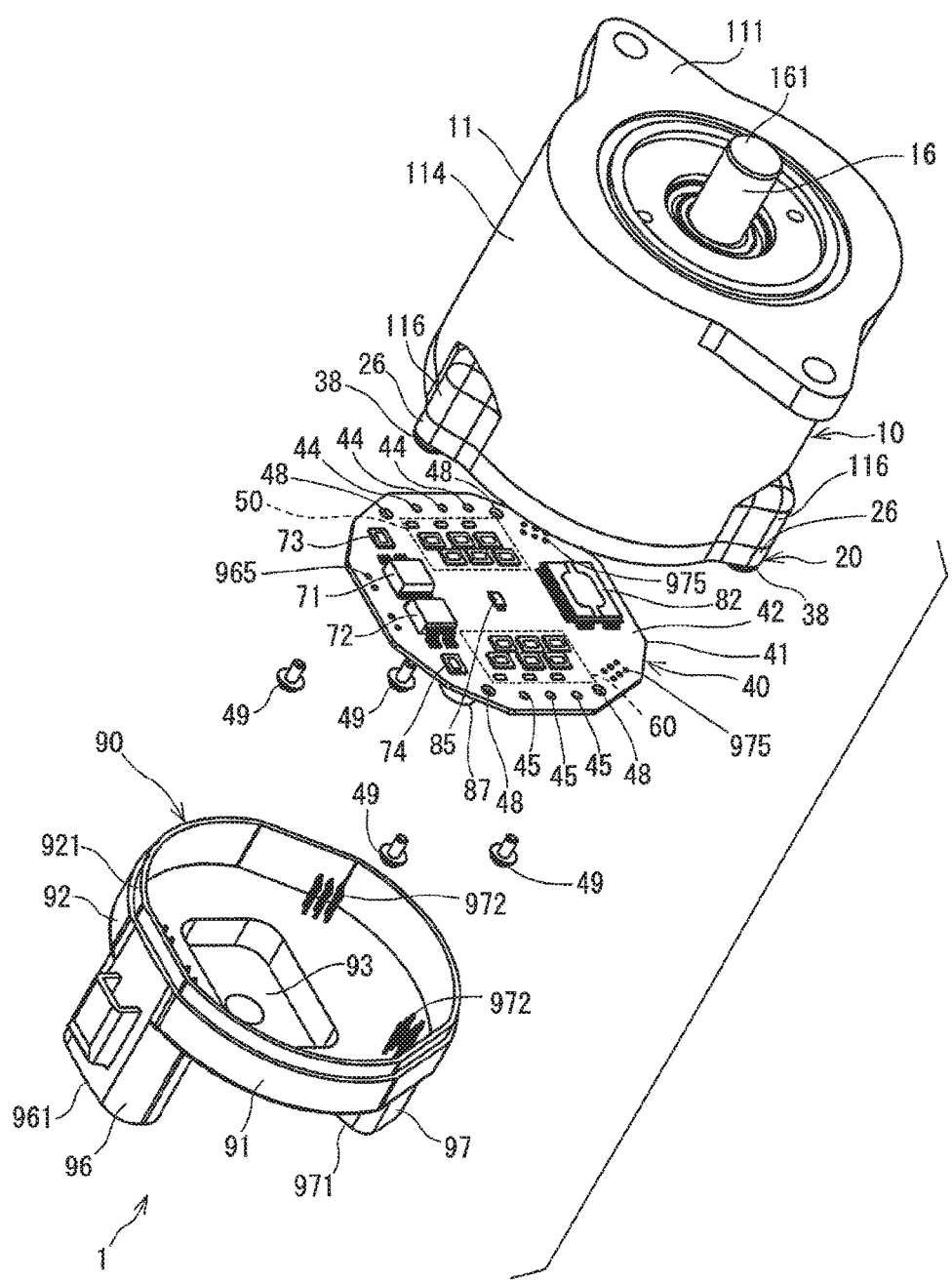
FIG. 8 is another exploded perspective view of the drive device in the first embodiment of the present disclosure.
Figure 9:
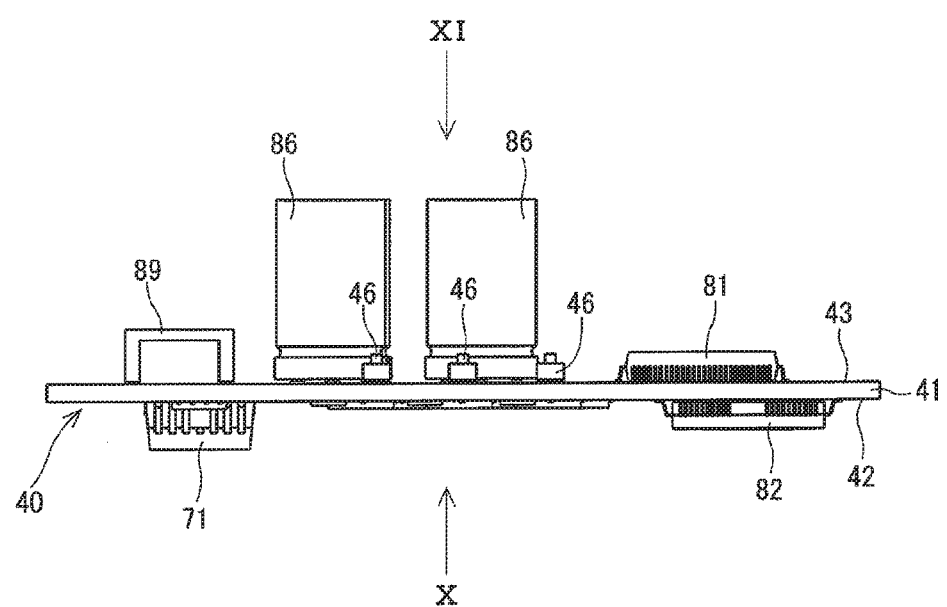
FIG. 9 is a side view of an Engine Control Unit (ECU) in the first embodiment of the present disclosure.
Figure 10:
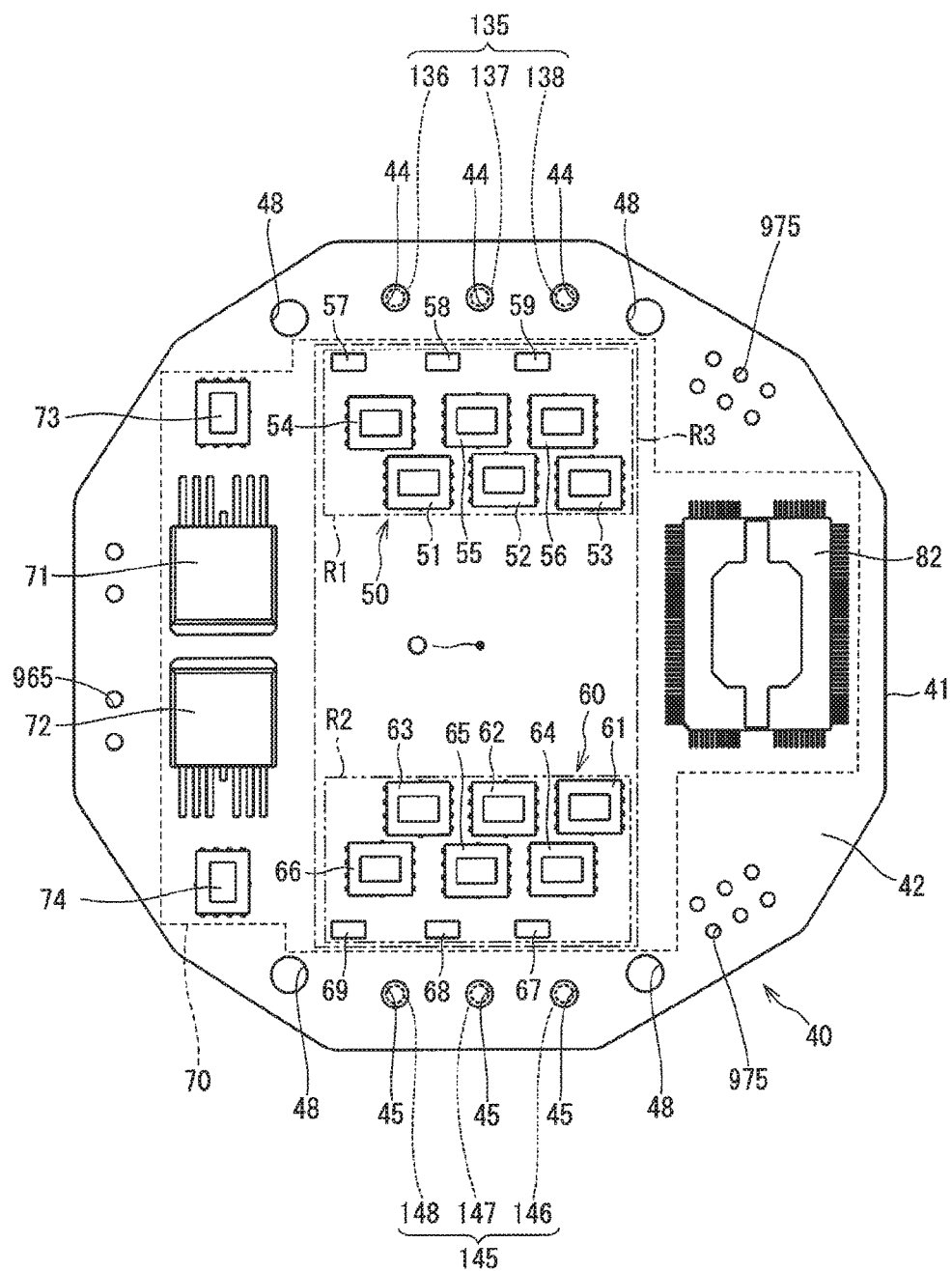
FIG. 10 is a bottom view of the ECU along an arrow X in FIG. 9.

As shown in FIG. 8 and FIG. 10, for example, the SW elements 51-56, 61-66 as well as the current detection elements 57-59, 67-69, the power relays 71, 72, the reverse connection protection relays 73, 74, the ASIC 82, and the rotational angle sensor 85 are surface-mounted on the heat generation element mount surface 42 together with other parts. The rotational angle sensor 85 is omitted from the illustration in FIG. 10. In the present embodiment, all components mounted on the heat generation element mount surface 42 and the microcomputer 81 mounted on the large-size component mount surface 43 are surface-mounted thereon. In other words, the controller components are surface-mounted on either of the two surfaces of the circuit substrate 41.

The rotational angle sensor 85 is mounted substantially at a center position on the heat generation element mount surface 42, which faces the magnet 18 exposed from the frame member 20. Here, when the axis line of the shaft 16 and its extension are considered as the center axis O of the motor 10, the rotational angle sensor 85 is mounted on the center axis O of the heat generation element mount surface 42 (see FIG. 3). In the present embodiment, the center axis O defines a "center point" of the circuit board 41.

On a face (i.e., a surface facing the frame member 20) of each of the reverse connection protection relays 73, 74 and the ASIC 82 which are mounted on the heat generation element mount surface 42, a heat dissipation slug made of heat conductive material such as copper is disposed, just like the SW elements 51-56, 61-66. Further, the SW elements 51-56, 61-66, the current detection elements 57-59, 67-69, the power relays 71, 72, the reverse connection protection relays 73, 74, and the ASIC 82 respectively contact the ECU side face 31 of the frame member 20 in a heat transferable manner via a heat dissipation gel 75 (not illustrated) (see FIGS. 12A, 12B, 13). Thereby, heat generated by the SW elements 51-56, 61-66, the current detection elements 57-59, 67-69, the power relays 71, 72, the reverse connection protection relays 73, 74, and the ASIC 82 is dissipated via the heat dissipation gel 75 to the frame member 20. In FIG. 3 or other drawings, the ASIC 82 and the frame member 20 may look like disposed in a non-contacting state, as a result of the omission of the heat dissipation gel 75.

That is, the SW element 51-56, 61-66, current detection elements 57-59, 67-69, the power relays 71, 72, the reverse connection protection relays 73, 74, and the ASIC 82, which are the components mounted on the heat generation element mount surface 42 other than the rotational angle sensor 85, are a heat generation element 70, respectively, and are configured to be able to dissipate heat to the frame member.

In the present embodiment, the frame member 20 defines an outline of the motor 10, provides a support for the ECU 40, and provides a heat dissipation path for dissipating heat from the heat generation element 70. Thereby, as compared with a case in which a heat sink is provided separately as an additional component, the number of components is reduced, and the volume of the drive device is reduced.

Figure 12A:
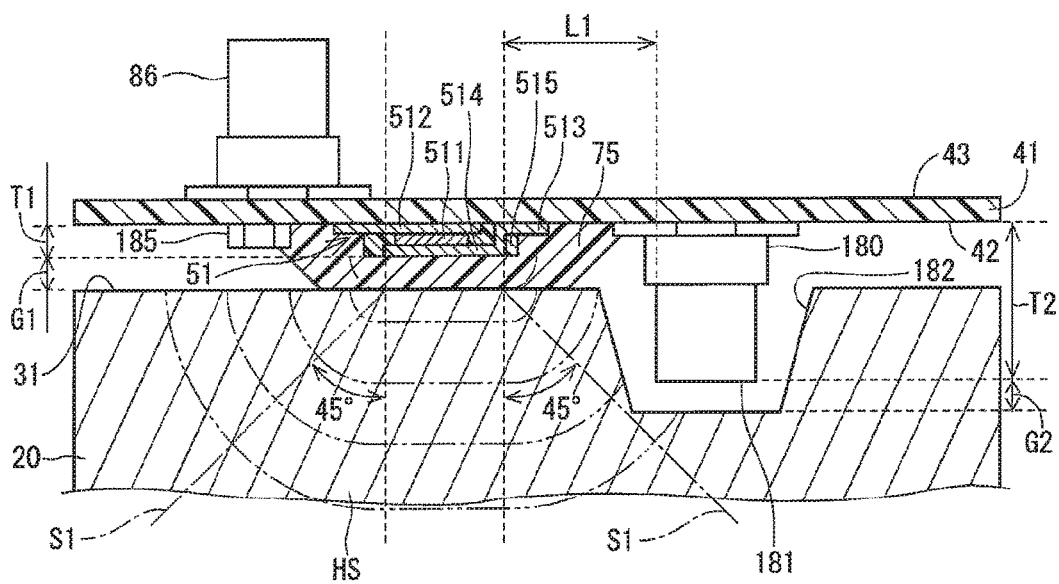
FIGS. 12A, 12B are sectional views of a frame member and a circuit board regarding a relationship between a switch (SW) element and other electronic components in the first embodiment of the present disclosure.
Figure 12B:
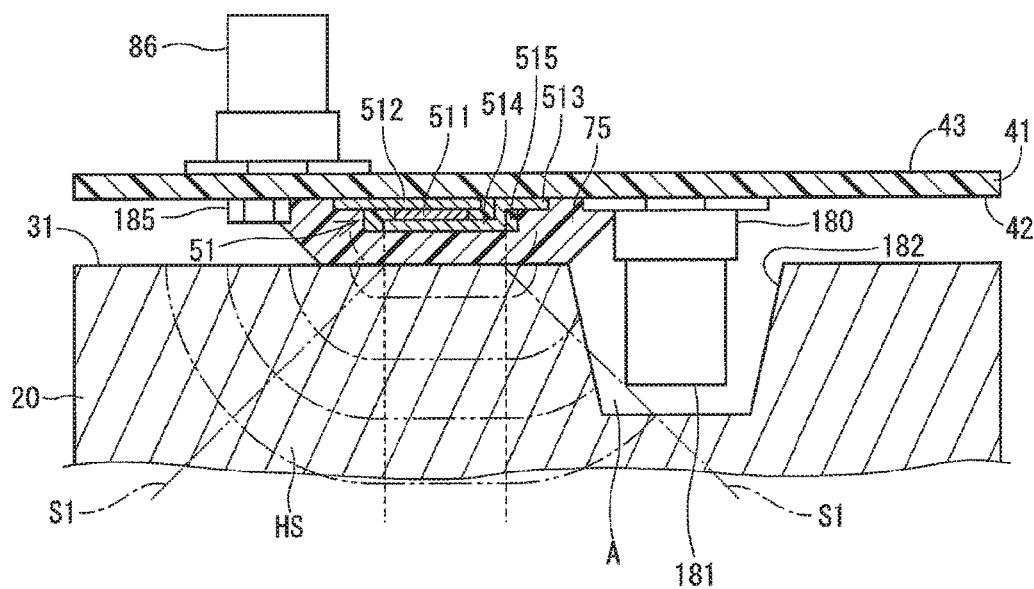

As shown in FIGS. 12A and 12B, the SW element 51 includes a chip 511, a drain terminal 512, a source terminal 513, a heat dissipation slug 514, and a mold part 515. The other SW elements, 52-56, and 61-66 respectively have the same configuration. That is, the third digit of the numeral 1, 2, 3, or 4 indicates that that part in each of the SW elements corresponds to the same part in the SW element 51.

Figure 13:
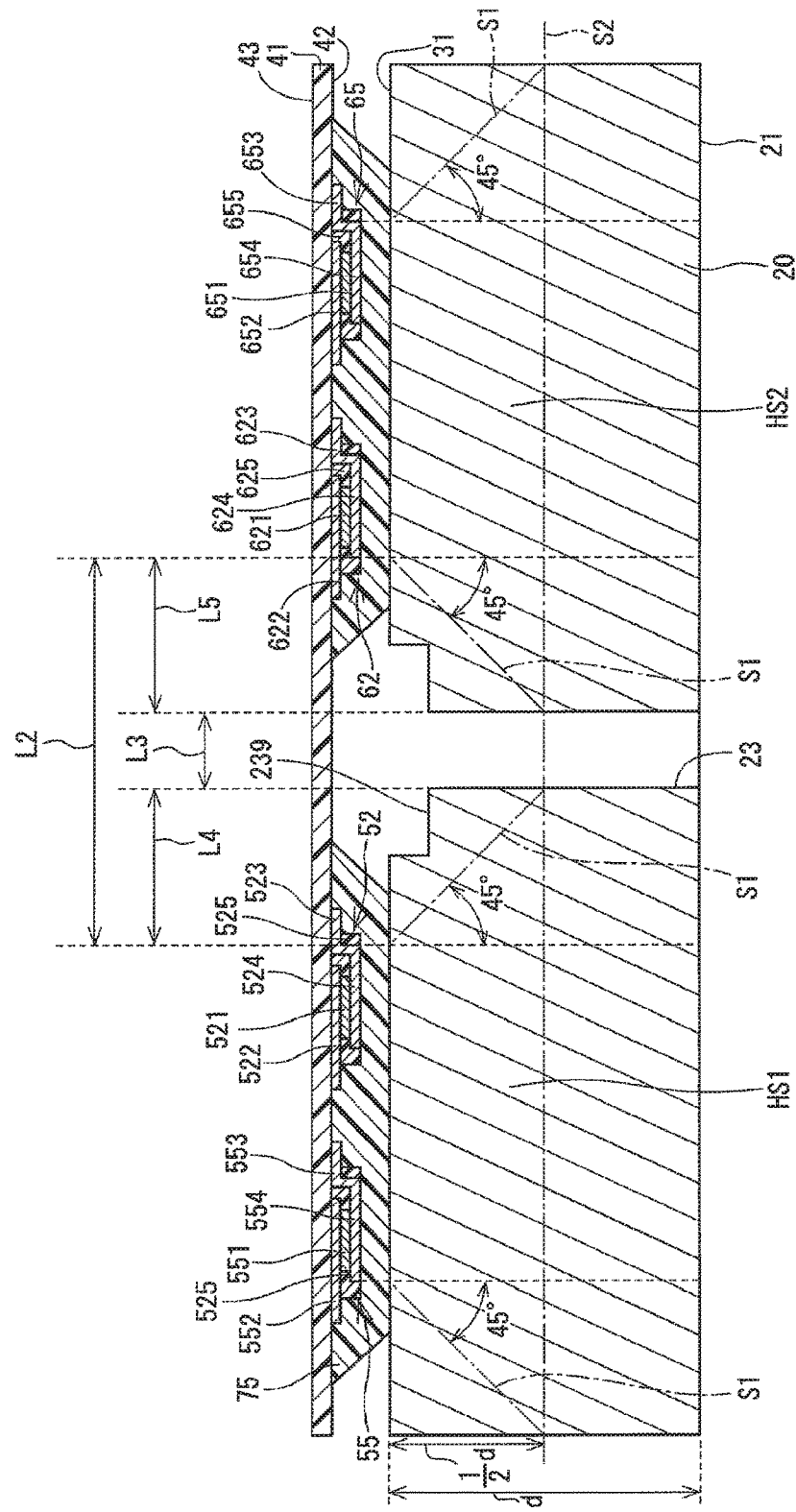
FIG. 13 is a sectional view of a frame member and a circuit board regarding a relationship between the SW element and a shaft hole in the first embodiment of the present disclosure.

The chip 511 is disposed on a land that is formed in one body with the drain terminal 512. The source terminal 513 protrudes from the mold part 515 on one end, and has the heat dissipation slug on the other end. In such manner, heat generated by the SW element 51 when the SW element 51 switches on and off to supply an electric current to the first winding group 13 is dissipated to the frame member 20 via the heat dissipation slug 514 and the heat dissipation gel 57. The exposed part of the heat dissipation slug 514 is designated as a "heat dissipation part". The illustrations in FIGS. 12A, 12B, 13 are for illustration purpose only, thereby not necessarily being accurate in terms of shapes and positions of the illustrated components, i.e., the shapes/positions may be different from FIGS. 3, 7, 10 etc.

A first region R1, where the SW elements 51-56 of the first inverter part 50 are mounted, and a second region R2, where the SW elements 61-66 and the current detection elements 67-69 of the second inverter part 60, are symmetrically arranged on the opposite sides of the center axis O of the motor 10.

In the present embodiment, the SW elements 51-56 and the SW elements 61-66 are arranged as axi-symmetric on both sides of a straight line passing through the center axis O of the motor 10.

The three phases of U, V, W are arranged in order from the relay 71 side in the first inverter part 50, and the three phases of W, V, U are arranged in order from the relay 72 side in the second inverter part 60, which makes a point-symmetric relation between the two inverters 50, 60 for the three phases. In the present embodiment, when an area in which the power relays 71, 72 are mounted is considered as a power supply region for supplying electric power from the battery 109 to the circuit board 41, the first inverter 50 has the first, second and third phases arranged from the power supply region side, and the second inverter 60 has the third second and first phases arranged from the power supply region side. The same applies to the motor lines 135, 145. That is, the phase sequence of the second system 202 is in a reverse order to the phase sequence of the first system 201.

Thereby, while the impedance is reduced, the length of wiring in each of the three phases on the circuit board 41 is substantially equated, and the variation of the impedance in each of the three phases is reduced, or the impedance is equated in all three phases. The "symmetry" in the above means a substantially-symmetric arrangement of the three phases, allowing a dimension error in the actual product.

Further, the SW elements 54-56 connected to the low potential side are arranged on the outside of the SW elements 51-53 connected to the high potential side, and the current detection elements 57-59 are arranged further on the outside of the SW elements 54-56.

Similarly, the SW elements 64-66 connected to the low potential side are arranged on the outside of the SW elements 61-63 connected to the high potential side, and the current detection elements 67-69 are arranged further on the outside of the SW elements 64-66.

Each of the SW elements 51-56 has a drain formed on the circuit board 41 side surface. Further, the first motor line 135 is connected to a source of each of the SW elements 51-53 that are connected on a high-potential side and to a drain of each of the SW elements 54-56 that are connected on a low-potential side (FIG. 2). Therefore, by positioning the low-potential side SW elements 54-56 on the radius outside of the high-potential side SW elements 51-53, the wiring on the circuit board 41 is made easy, because the low-potential side SW elements 54-56 are connected to the first motor line 135 that is positioned outside of the elements 54-56.

The same configuration applies to the configuration of the SW elements 61-66 and the second motor line 145.

When the first region R1 and the second region R2 together with the center axis O are considered as a drive element mount region R3, the ASIC 82 is positioned on an outside of the drive element mount region R3. Further, the power relays 71, 72 and the reverse connection protection relays 73, 74 are positioned on an opposite side of the ASIC 82, relative to the drive element mount region R3. In the present embodiment, the regions R1 to R3 are respectively illustrated as rectangular areas. However, the regions R1 to R3 may have other shapes other than the rectangular shapes, depending on the outline of an area that is defined to include mounting positions of all elements, i.e., the SW elements 51-56, 61-66 and the current detection elements 57-59, 67-69.

The positional relationship among the components mounted on the heat generation element mount surface 42 are further described in the following paragraphs.

The large components, (i.e., more specifically, taller components in comparison to the SW elements 51-56, 61-66 in terms of height from the surface 41) which are the relays 71, 72, are housed in the relay room 33, 34 on the ECU side face 31 of the frame member 20. Also, the other taller component, i.e., the ASIC 82 is housed in the ASIC room 35 on the ECU side face 31 of the frame member 20. In the present embodiment, the power relay 71 and 72 and the ASIC 82 are designated as a "large-size component", and the relationship between SW element 51 and a large-size component 180 (i.e., representing the power relay 71 and 72 and the ASIC 82) is described as an example in FIGS. 12A and 12B. In FIGS. 12A and 12B, the size, the height, of the large-size component 180 in the axial direction is emphasized.

As shown in FIG. 12B, heat of the SW element 51 is transmitted to the frame member 20, as indicated by a two-dot chain line. A high-heat dissipation section HS is defined within the frame member 20, inside of two diffusion lines S1 which extend at an angle of 45 degrees relative to an axial direction, or a direction along the rotational axis of the rotor 15. The two diffusion lines S1 extend diagonally-outwardly from each of the edges, or ends, of an axial projection, (i.e., a silhouette of the heat dissipation slug 514 along the axial direction, or a perpendicular projection relative to the surface of the board 41) on the frame member 20. Together the two diffusion lines S1 and the axial projection of the heat dissipation slug 514 on the frame member 20 form the high-heat dissipation section having a trapezoidal cross-section when viewed from a direction perpendicular to the rotational axis of the rotor 15, as seen in FIG. 12A. The two diffusion lines S1 form the opposing non-parallel sides of the trapezoid, while the projection of the heat dissipation slug 514 on the frame member 20 that is also a part of the frame member 20 forms a tope element of the trapezoid. The section HS as defined above must not be invaded by a large-size component room for maintaining a heat dissipation efficiency. For example, when space A in FIG. 12B invades a large-size component room 182, which collectively represents the relay rooms 33, 34 and the ASIC room 35, the heat dissipation efficiency for dissipating heat from the SW element 51 deteriorates.

Therefore, in the present embodiment, when the large-size component 180 having a larger axial size (i.e., a height greater) than the SW element 51 is mounted on the heat generation element mount surface 42, the large-size component room 182 (i.e., corresponding to the relay rooms 33, 34 and the ASIC room 35 in the present embodiment), which is a concavity formed on the ECU side face 31 of the frame member 20 in order to house the large-size component 180, is positioned away from the SW element 51, for the high-heat dissipation section HS not to overlap with the room 182, according to the size of the large-size component 180.

For example, when a tall component such as an aluminum electrolytic capacitor etc. is mounted on the heat generation element mount surface 42, the taller (i.e., the height) the component is, the farther the room 182 is positioned away from the SW element 51.

More specifically, as shown in FIG. 12A, a distance L1 is defined as a dimension between (i) a component 180 side edge of the heat dissipation slug 514 on surface that is in parallel with the surface 42 and (ii) a SW element 51 side of a top part 181 of the large-size component 180, the distance L1 is shown in an equation (1).

$$L1 \geq T2 + \{2-(\sqrt{2})\} \times G2 - T1 - G1 \qquad \text{Equation (1)}$$

The signs in the equation (1) are defined in the following manner:

T1: Height of the SW element 51

G1: Interval of the SW element 51 and the frame member 20

T2: Height of the large-size component 180

G2: The shortest interval between the large-size component 180 and the frame member 20 (i.e., an interval along the axial direction in the present embodiment)

Although the coefficient $\{2-(\sqrt{2})\}$ of G2 in the equation (1) assumes that a connecting part between a side wall and a bottom wall of the large-size component room 182 has a curved shape, or a tapered shape, if such part is not formed in the tapered shape, the coefficient of G2 may be simply set to 2.

When the SW element 51 and the large-size component 180 are positioned with a sufficient interval, i.e., away from each other by the distance L1 calculated by the equation (1), the high-heat dissipation section HS and the large-size component room 182 of the SW element 51 will not overlap, and heat from the SW element 51 is dissipated to the frame member 20 highly efficiently.

In the above situation, heat from the large-size component 180 may be dissipated to the frame member 20 by filling a gap between the component 180 and the frame member 20 with the heat dissipation gel 75, or heat from the component 180 may be not transmitted/dissipated to the frame member 20 with the gap left unfilled.

Further, a small component 185 with a height thereof smaller than the height of the SW element 51 may be mountable on the heat generation element mount surface 42 without forming a concavity etc. on the ECU side face 31 of the frame member 20. Therefore, it is not necessary for the SW element 51 to be positioned away from the SW element 51 (e.g., the small component 185 may be positioned close to the SW element 51). As for the small component 185, the current detection elements 57-59, 67-69, the reverse connection protection relays 73 and 74 as well as a chip and a capacitor etc. are considered.

Next, the positional relationship between the SW elements 51-56, 61-66 and the shaft hole 23 is described based on FIG. 13. In FIG. 13, in order to simplify the description, components other than the SW elements 52, 55, 62 and 65 which are actually mounted on the circuit boards 41 are omitted from the drawing. Hereafter, the focus of the description is put on heat dissipation from the SW elements 52, 55, 62, and 65.

The diffusion line S1 is defined as a 45 degree line extending toward an outside of the first region R1 from each of both far-side edges of projection areas of heat dissipation slugs 524, 554 perpendicularly projected onto the circuit board 41, and also as a 45 degree line extending toward an outside of the second region R2 from each of both far-side edges of projection areas of heat dissipation slugs 624, 654 perpendicularly projected thereonto.

Further, the axial length of the frame member 20 required for the heat dissipation from the SW elements 51-56, 61-66 is defined as a required thickness d. In the present embodiment, the required thickness d is equal to the thickness between the motor side face 21 and the ECU side face 31 of the frame member 20.

Further, a dividing line that divides the required thickness d in half is defined as a virtual dividing line S2. Then, a section above the dividing line S2 and under the diffusion line S1 is defined high-heat dissipation sections HS1 and HS2. Among HS1 and HS2, HS1 corresponds to the SW elements 51-56 that serve as the first inverter part 50, and HS2 corresponds to the SW elements 61-66 that serve the second inverter part 60.

Heat from the SW elements 52, 55, 62, and 65 spreads radially outwardly in HS1 and HS2 while transmitting axially, i.e., toward the lower part of the illustration in FIGS. 12A/B. Further, heat from the SW elements 52, 55, 62, and 65 mainly transmits in the axial direction, further downward in FIGS. 12A/B once heat passes across the virtual dividing line S2 toward the motor 10 side.

As already mentioned with reference to FIGS. 12A/B, when the high-heat dissipation sections HS1, HS2 are invaded by the digging, (i.e., by the room 182) heat dissipation efficiency for dissipating heat from the SW elements 52, 55, 62, 65 is affected (i.e., deteriorated).

Further, in the present embodiment, the SW elements 51-55 and the SW elements 61-66 are arranged on the opposite side of the center axis O, and the shaft hole 23 is bored on the frame member 20 at a position between two parts, i.e., between a SW element 52 facing part and a SW element 62 facing part. Therefore, the SW element 52 and the SW element 62 are positioned away from each other, so that the high-heat dissipation sections HS1, HS2, and the shaft hole 23 may not overlap.

More specifically, a distance L2 is defined in the following manner. That is, the distance L2 according to an equation (2) is a dimension between (i) a SW element 62 side edge of the slug 524 for the SW element 52 and (ii) a SW element 52 side edge of the slug 624 for the SW element 62.

In the equation (2), a sign L3 is a distance between wall portions in the shaft hole 23 on the virtual dividing line S2.

$$L2 \geq d + L3 \quad \text{Equation (2)}$$

In other words, the SW element 52 is positioned on the heat generation element mount surface 42 so that a distance L4 between (i) an edge of the slug 524 for the SW element 52 on a shaft hole 23 side and (ii) a wall of the shaft hole 23 on a SW element 52 side is equal to or greater than ½d, i.e., is equal to or greater than a half of the required distance d when such a distance L4 is measured on the heat generation element mount surface 42.

Similarly, a distance L5 is defined as a dimension between (i) an edge of the slug 624 for the SW element 62 on a shaft hole 23 side and (ii) a wall of the shaft hole 23 on a SW element 62 side is equal to or greater than ½d, (i.e., is equal to or greater than a half of the required distance d) when such a distance L5 is measured on the heat generation element mount surface 42.

The above configuration guarantees that there is no digging of the shaft hole 23 invading into the high-heat dissipation sections HS1, HS2, thereby enabling a high efficient heat dissipation from the SW elements 52, 62. Further, as shown in FIG. 13, for accommodating the magnet 18, a step part 239 may be provided for the shaft hole 23 within a range above the diffusion line S1, so that the step part 239 and the high-heat dissipation sections HS1 and HS2 will not overlap with each other.

Based on the above configuration, heat from the other SW elements, (i.e., the SW elements 51, 53-56, 61, 63-66) each of which is farther away from the center axis O than the SW elements 52, 62 (see FIG. 10, for example), is also highly efficiently dissipated from those elements, since the distance from each of the heat dissipation slugs for the SW elements 51, 52-56, 61, 63-66 to the shaft hole 23 is greater than the distance from each of the SW elements 52, 62 to the shaft hole 23, that is, a non-overlapping positioning is achieved between (i) the high-heat dissipation sections HS1 and HS2 of each of the SW elements 51, 53-56, 61, 63-66, HS2 and (ii) the shaft hole 23.

Although description of FIG. 13 is focused on the positional relationship between the high-heat dissipation sections HS1, HS2 and the shaft hole 23, the same may be true for the positional relationship between the high-heat dissipation sections HS1, HS2 and motor line insertion holes 24 and 25 in FIG. 13. That is, according to the present embodiment, the shaft hole 23 and motor line insertion holes 24 and 25 respectively correspond to a "hole." Further, the high-heat dissipation section HS corresponds to a "first high heat dissipation section", and the high-heat dissipation sections HS1 and HS2 correspond to the "second high heat dissipation section."

Figure 11:
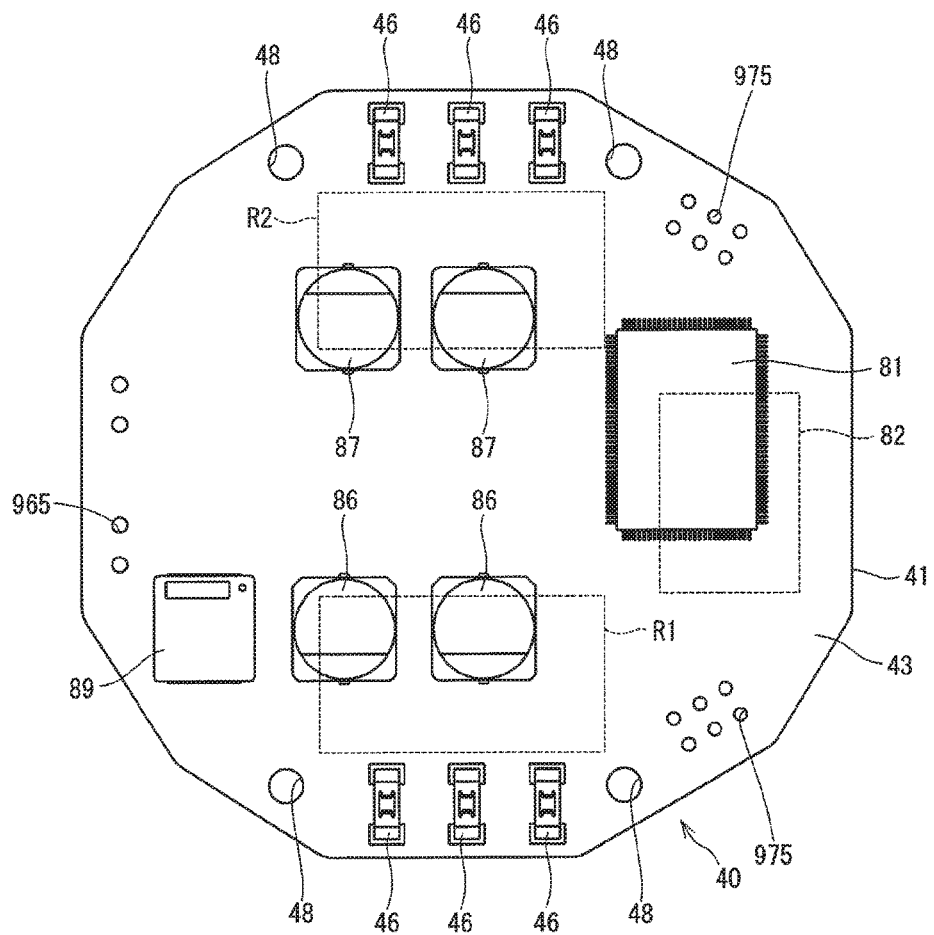
FIG. 11 is a top view of the ECU along an arrow XI in FIG. 9.

As shown in FIG. 7 and FIG. 11 together with other illustrations, the microcomputer 81, the capacitors 86 and 87, the choke coil 89 and the like are mounted on the large-size component mount surface 43.

The microcomputer 81 is mounted on a reverse side of the ASIC 82 at a position that at least partially overlaps a mounting position of the ASIC 82. Further, the microcomputer 81 is mounted at a position which is outside of the drive element mount region R3. In FIG. 11, the drive element mount region R3 is not illustrated.

Heat of the ASIC 82 is dissipated to the frame member 20 in the present embodiment. Therefore, it is not necessary to form a via (i.e., hole) for dissipating heat from the ASIC 82 toward a circuit board 41 side, thereby making it possible to utilize the reverse side of an ASIC 82 mounting portion on the large-size component mount surface 43, for a high-density mounting of the electronic components, such as the microcomputer 81 and the like, by disposing wiring on the reverse side of the ASIC 82. That is, by mounting relatively large components in an overlapping manner on both surfaces of the circuit board 41, i.e., mounting the microcomputer 81 on one surface and mounting the ASIC 82 on the reverse surface in an overlapping manner, the mounting area of the circuit board 41 is efficiently used, facilitating the size reduction of the circuit board 41. Further, the wiring length between the microcomputer 81 and the ASIC 82 is reduced.

The capacitor 86 is mounted on a reverse side of the circuit board 41, i.e., partially overlapping with the first region R1, in which the SW elements 51-56 of the first inverter part 50 are mounted. The capacitor 87 is mounted on a reverse side of the circuit board 41 (i.e., partially overlapping with the second region R2, in which the SW elements 61-66 of the second inverter part 60 are mounted). The noise reduction effect increases by arranging the capacitors 86, 87 on the reverse side of the inverter parts 50, 60.

In the present embodiment, by mounting relatively large-size electronic components, e.g., the capacitors 86, 87 and the choke coil 89, on the large-size component mount surface 43, the circuit board 41 is positioned at a proximity of the frame member 20. Thereby, heat generated by the heat generation element 70 on the heat generation element mount surface 42 is dissipated to the frame member 20 from the "back" of those components.

A radius outside position of the first region R1 (relative to the center axis O) has a motor line insertion hole 44 bored therethrough. The first motor line 135 is inserted into the motor line insertion hole 44. A radius outside position of the second region R2 has a motor line insertion hole 45 bored therethrough. The second motor line 145 is inserted into the motor line insertion hole 45.

On the large-size component mount surface 43, a motor line connector 46 made from a conductive metal or the like is provided at a position where the motor line insertion holes 44 and 45 are bored. The motor line connector 46 has a press-fit part, and the press-fit part receiving the motor lines 135 and 145 establishes an electrical connection between the circuit board 41 and the motor lines 135, 145.

A hole 48 is bored at a position corresponding to the circuit board fixing tab 32 of the circuit board 41. A circuit board lockscrew 49 (see FIGS. 7 and 8) is inserted into the hole 48, and is tightly screwed onto the circuit board fixing tab 32 of the frame member 20. The circuit board 41 is fixed onto the frame member 20 in such manner.

As shown in FIGS. 3-8, a cover member 90 has a cover body 91, a power supply connector 96, and a signal connector 97, and covers the large-size component mount surface 43 side of the circuit board 41.

An insert portion 921 is provided at one end of a peripheral wall 92 of the cover body 91. The insert portion 921 is inserted into the adhesion groove 37 of the frame member 20, and is fixed by the adhesive. Thereby, water or the like is prevented from intruding into the motor 10 from a connection portion between the frame member 20 and the cover member 90.

A capacitor room 93 is formed substantially at the center of the cover body 91. The capacitor room 93 protrudes from the cover body 91 (i.e., away from the motor 10) for accommodating the capacitors 86, 87. A breathing hole 94 is bored on the capacitor room 93. The breathing hole 94 has a filter member 95 attached thereon. The filter member 95 is made from a material that passes air but does not pass the water. By having the filter member 95 in the breathing hole 94, the inner pressure of the drive device 1 stays constant at a certain value even when the temperature changes.

The power supply connector 96 and the signal connector 97 (i.e., "connectors 96 and 97" hereinafter) respectively protrude away from the cover body 91, (i.e., away from the motor 10). In the present embodiment, the connectors 96 and 97 are integrally formed with the cover body 91 in one body.

The power supply connector 96 has an opening 961 disposed on one end which extends away from the motor 10, for a connection to a harness (not illustrated) that extends from the battery 109. Further, the power supply connector 96 has a power supply connector terminal 962 connected to the circuit board 41. The power supply connector terminal 962 is inserted into a terminal insertion hole 965 bored on the circuit board 41, and is connected to the circuit board 41 by solder or the like. Thereby, the ECU 40 is connected to the battery 109.

The signal connector 97 has an opening 971 disposed on one end which extends away from the motor 10, for a connection to a harness (not illustrated). In the present embodiment, two signal connectors 97 are provided, among which one is connected to a harness extending from the torque sensor 103 and the other is connected to a harness extending from CAN. Further, the signal connector 97 has a signal connector terminal 972 connected to the circuit board 41. The signal connector terminal 972 is inserted into a terminal insertion hole 975 disposed on the circuit board 41, and is connected to the circuit board 41 by solder or the like. Thereby, information from the torque sensor 103 and information from CAN are input into the ECU 40.

The tip of each of the power supply connector terminal 962 and the signal connector terminal 972 (i.e., "terminals 962 and 972" hereinafter) is inserted into the terminal receptacle groove 36 that is formed on the ECU side face 31 of the frame member 20, so that the terminals 962, 972 and the frame member 20 are not short-circuited with each other.

The drive device 1 is provided with the motor 10, the frame member 20, the circuit board 41, the SW elements 51-56, 61-66, the ASIC 82, and the microcomputer 81 as described in full details above.

The motor 10 has the stator 12 on which the first winding group 13 and the second winding group 14 are wound, the rotor 15 rotatable relative to the stator 12, and the shaft 16 rotatable together with the rotor 15.

The frame member 20 is disposed on one side of the axial direction of the motor 10.

The SW elements 51-56, 61-66 for implementing the inverter parts 50 and 60 which respectively switch the electric current supplied to the winding groups 13 and 14 are mounted on the heat generation element mount surface 42, which is one face of the circuit board 41 facing the frame member 20, in a heat dissipatable manner for dissipating heat from those elements to the frame member 20.

The controller component 80 includes at least one of the pre-driver 821, the regulator 823, and the signal processor 822, and the rotational angle sensor 85, and is mounted on the circuit board 41, on which the SW elements 51-56, 61-66 are also mounted. The microcomputer 81 performs a calculation process. The pre-driver 821 outputs a drive signal to the SW elements 51-56, 61-66 and to other device. The regulator 823 adjusts an output voltage of the battery 109 to a preset voltage, and outputs the adjusted voltage. The signal processor 822 processes an input signal. The rotational angle sensor 85 detects a rotation angle of the rotor 15.

According to the present embodiment, the SW elements 51-56, 61-66 are heat-dissipatably mounted for dissipating heat to the frame member 20. In such manner, compared to provide a heat sink separately for those SW elements, the number of components is reduced.

Further, the frame member 20 is fixedly disposed on one axial end of the motor 10. In such manner, the volume and/or the size of the drive device 1 along the radius direction is reduced.

Further, the frame member 20 is disposed on one axial end of the motor 10 which is opposite to an output end 165 of the shaft 16 of the motor 10 for outputting a drive power. That is, the output end 165 of the shaft 16 does not pierce through the circuit board 41, which allows an entire surface of the circuit board 41 is usable for the mounting of the components, facilitating the size reduction of the circuit board 41.

The circuit board 41 is fixedly disposed on an opposite side of the frame member 20 relative to the motor 10. Therefore, in comparison to a circuit board mounting on the motor side of the frame member 20, the frame member 20 is easily attached to the motor 10. Further, regardless of the size of the electronic components mounted on the circuit board 41, the frame member 20 is reduced in size.

The drive device 1 has the current detection elements 57-59, 67-69 that are mounted on the heat generation element mount surface 42 of the circuit board 41 for detecting the electric current supplied to the first and second winding groups 13 and 14. In such manner, the wiring length for those elements 57-59, 67-69 is decreased, thereby reducing a wiring impedance and a damping at an electric current variation time, and appropriately enabling an electric current detection.

The current detection elements 57-59, 67-69 are mounted on a heat dissipatable manner for dissipating heat to the frame member 20. Therefore, heat generated by the supply of the electric power to the current detection elements 57-59, 67-69 is dissipated to the frame member 20, thereby enabling a volume reduction of the drive device 1 and reducing the detection error of the electric current.

In the present disclosure, among the electronic components serving as the controller component 80, the ASIC 82, which needs to have a way to dissipate heat, is mounted on the heat generation element mount surface 42, and heat of the ASIC 82 is configured to be dissipatable to the frame member 20. In such manner, heat from the ASIC 82 is appropriately dissipated to the frame member 20. Further, by dissipating heat from the ASIC 82 to the frame member 20, a heat dissipation via for dissipating heat toward the circuit board 41 is dispensed. Therefore, an area or the circuit board 41 on the reverse side of the ASIC 82 can be used to mount an electronic component (i.e., the microcomputer 81 in the present embodiment), thereby more efficiently utilizing the mount surface of the circuit board 41 and facilitating the volume reduction of the product.

The drive device 1 is mounted on the heat generation element mount surface 42, and is provided with a large-size component 180 having a greater height than the SW elements 51-56, 61-66 from the heat generation element mount surface 42.

Further, the frame member 20 has a large-size component room 182 in which the large-size component 180 is accommodated. The frame member 20 has the high-heat dissipation section HS defined as an inside of a diffusion line S1 which extends at an angle of 45 degrees diagonally-outwardly from each of both edges of a projection position (i.e., a silhouette) of the heat dissipation portion on the frame member 20 along the axial direction (i.e., perpendicular projection relative to the ECU side face 31 of the board 41). The large-size component room 182 is formed not to overlap the high-heat dissipation section HS.

In other words, the large-size component 180 is positioned away from the SW elements 51-56, 61-66 according to the height of the large-size component 180, so that the large-size component room 182 and high-heat dissipation sections HS do not overlap with each other.

Thereby, the space A, which is an invasion space of the room 182 into the high-heat dissipation section HS, is not formed, thereby allowing heat to be highly efficiently dissipated from the SW elements 51-56, 61-66 to the frame member 20.

The frame member 20 is provided with the shaft hole 23 and the motor line insertion holes 24 and 25 which pierces the frame member 20 substantially perpendicularly to its surfaces. In the present embodiment, a thickness of the frame member 20 required for heat dissipation of the SW elements 51-56, 61-66 is designated as the required heat dissipation thickness d, and the high-heat dissipation sections HS1, HS2 of the frame member 20 are defined as an inside of the diffusion line S1 which extends at an angle of 45 degrees diagonally-outwardly from each of both edges of a projection position of the heat dissipation portion of the SW elements 51-56, 61-66 on the ECU side face 31 of the frame member 20 and above the half of the required heat dissipation distance d, which is close to the circuit board 41.

The shaft hole 23 and the motor line insertion holes 24 and 25 are formed at a portion which does not overlap with the high-heat dissipation sections HS1 and HS2.

Since the high-heat dissipation section HS2, the shaft hole 23, and motor line insertion holes 24 and 25 do not overlap with each other, and the space (i.e., a "void" hole) is not formed in high-heat dissipation sections HS1 and HS2, heat of the SW elements 51-56, 61-66 is highly efficiently dissipated to the frame member 20.

Further, when there is no through hole such as the shaft hole 23 or the like, the SW elements 51-56 and the SW elements 61-66 are mounted at appropriate positions so as not to overlap HS1 with HS2, respectively corresponding to the SW elements 51-56 of the first inverter part 50 and to the SW elements 61-66 of the second inverter part 60, heat from the SW elements 51-56, 61-66 highly efficiently dissipated to the frame member 20.

By having two inverter parts 50 and 60 and dividing the electric current into two, the SW elements 51-56, 61-66, the current detection elements 57-59, 67-69 as well as the capacitors 86 and 87 are reduced in size, and the large current tolerance width of the wiring is also reduced by half, the compact mounting of the electronic components is enabled.

Simultaneously, the same effect is obtained by using two power relays 71, 72 and two reverse connection protection relays 73 74 in two systems.

Further, the motor line insertion section 44 into which the first the motor line 135 taken out from the first region R1 and the first winding group 13 corresponding thereto which serve as the first inverter part 50 is inserted is arranged on an opposite side across the center axis O of the circuit board 41 relative to the motor line insertion section 45 in which the second the motor line 145 taken out from the second region R2 and the second winding group 14 which serve as the second inverter part 60 is inserted, the two wiring lines on both sides of the center axis O are efficiently formed while distributing heat generation portions to two positions, the volume reduction of the product is further facilitated.

The drive device 1 is provided with the capacitors 86 and 87. The capacitors 86 and 87 are mounted on the large-size component mount surface 43 which is an opposite side of the circuit board 41 relative to the frame member 20, and the positions of the capacitors 86, 87 on the surface 43 are at least partially overlapping with the regions R1, R2 where the SW elements 51-56, 61-66 are mounted.

Since the wiring length is reduced by the above configuration and the wiring impedance is reduced compared with a case where the capacitors 86 and 87 are arranged in other parts of the surface 43, the noise reduction effect of the first inverter part 50 and the second inverter part 60 increases.

When the drive element mount region R3 is defined as including the center axis O of the circuit board 41 as well as including the regions R1, R2 where the SW elements 51-56, 61-67 are mounted, the microcomputer 81 and the ASIC 82 are arranged on the outside of the drive element mount region R3. By arranging relatively large-size components such as the microcomputer 81 and the ASIC 82 on the outside of the drive element mount region R3 on circuit board 41, a large electric current part and a signal control part are separated, and an influence of the large current switching noise to a control part is reduced.

Further, the large electric current part has a compact wiring arrangement according to the above configuration, the mounting area of the circuit board 41 is utilized efficiently, and the product size is reduced.

The drive device 1 is mounted on the heat generation element mount surface 42 in a heat dissipatable manner to the frame member 20, and is provided with the power relays 71, 72 and the reverse connection protection relays 73, 74 for switching between conduction and interception of the power supply from the battery 109 to the inverter parts 50 and 60. Thereby, heat generated by the power supply to the power relays 71, 72 and to reverse connection protection relays 73, 74 is appropriately dissipated to the frame member 20.

The power relays 71, 72 and the reverse connection protection relays 73, 74 are arranged on an opposite side of the microcomputer 81 and the ASIC 82 relative to the drive element mount region R3. Thereby, the mounting area of the heat generation element mount surface 42 on the circuit board 41 is utilized efficiently, and each of those components are arranged appropriately.

The drive device 1 of the present embodiment is applied to the electric power steering device 8. That is, the electric power steering device 8 is provided with the drive device 1 and the speed reduction gear 9 which transmits the torque outputted from the motor 10 to the column shaft 102, and assists a steering operation of the steering wheel 101 by a driver based on the output torque of the motor 10 which is used to drive the column shaft 102.

In the drive device 1 of the present embodiment, the motor 10 and the ECU 40 are provided on the same axis, and the SW elements 51-56, 61-66 and the controller component 80 are mounted on the same circuit board 41 for dissipating heat from the SW elements 51-56, 61-66 to the frame member 20, for the reduction of the product volume. Therefore, the drive device is installable in a small installation space.

Further, the drive device 1 of the present embodiment has the O ring 39 disposed at a position between the motor case 11 and the frame member 20, and the frame member 20 and the cover member 90 are fixed with adhesives. Therefore, the drive device 1 of the present embodiment has a waterproof construction. In other words, the drive device 1 may be installed in an engine room, for example, and may suitably be applicable to a rack-assist type electric power steering device.

(Second Embodiment)

Figure 14:
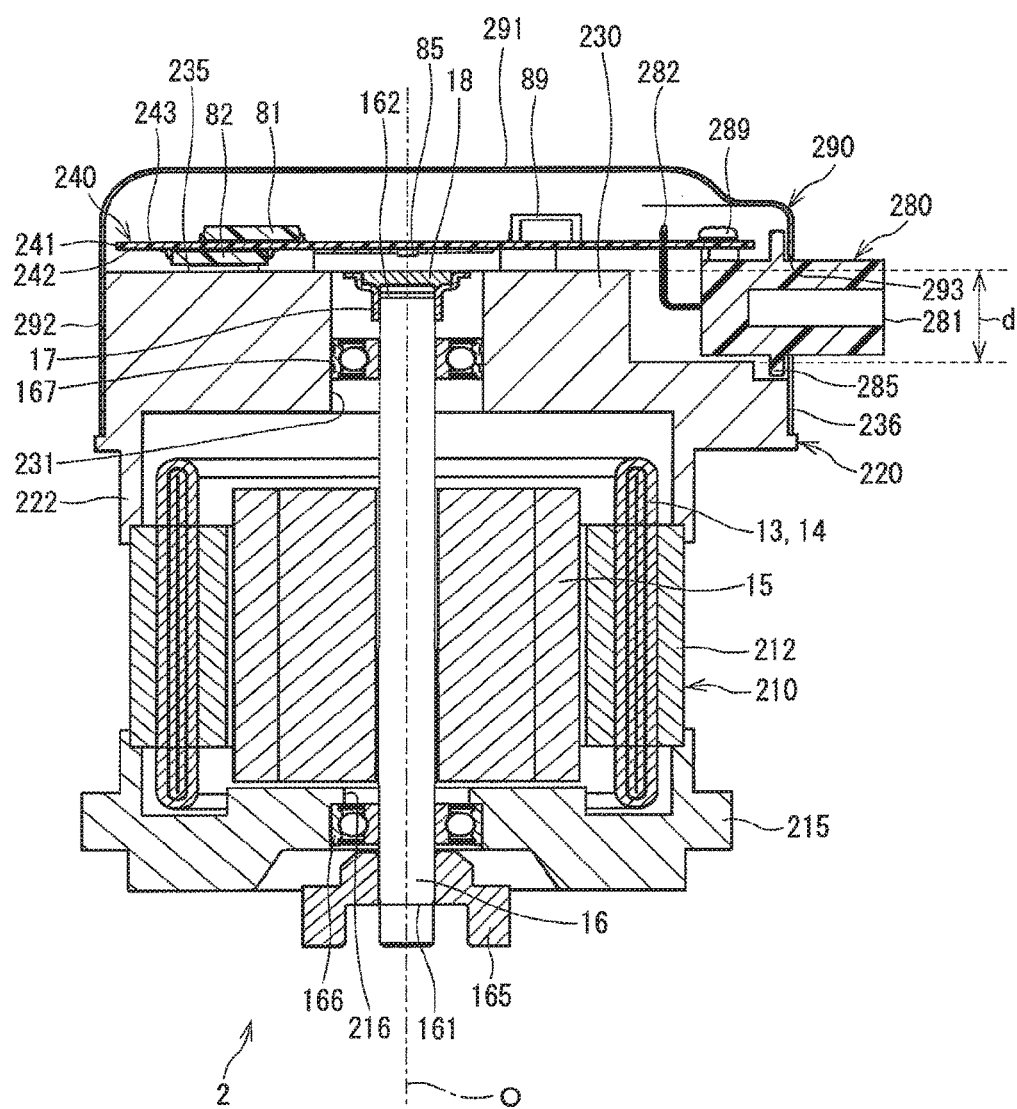
FIG. 14 is a sectional view of the drive device in a second embodiment of the present disclosure.
Figure 15:
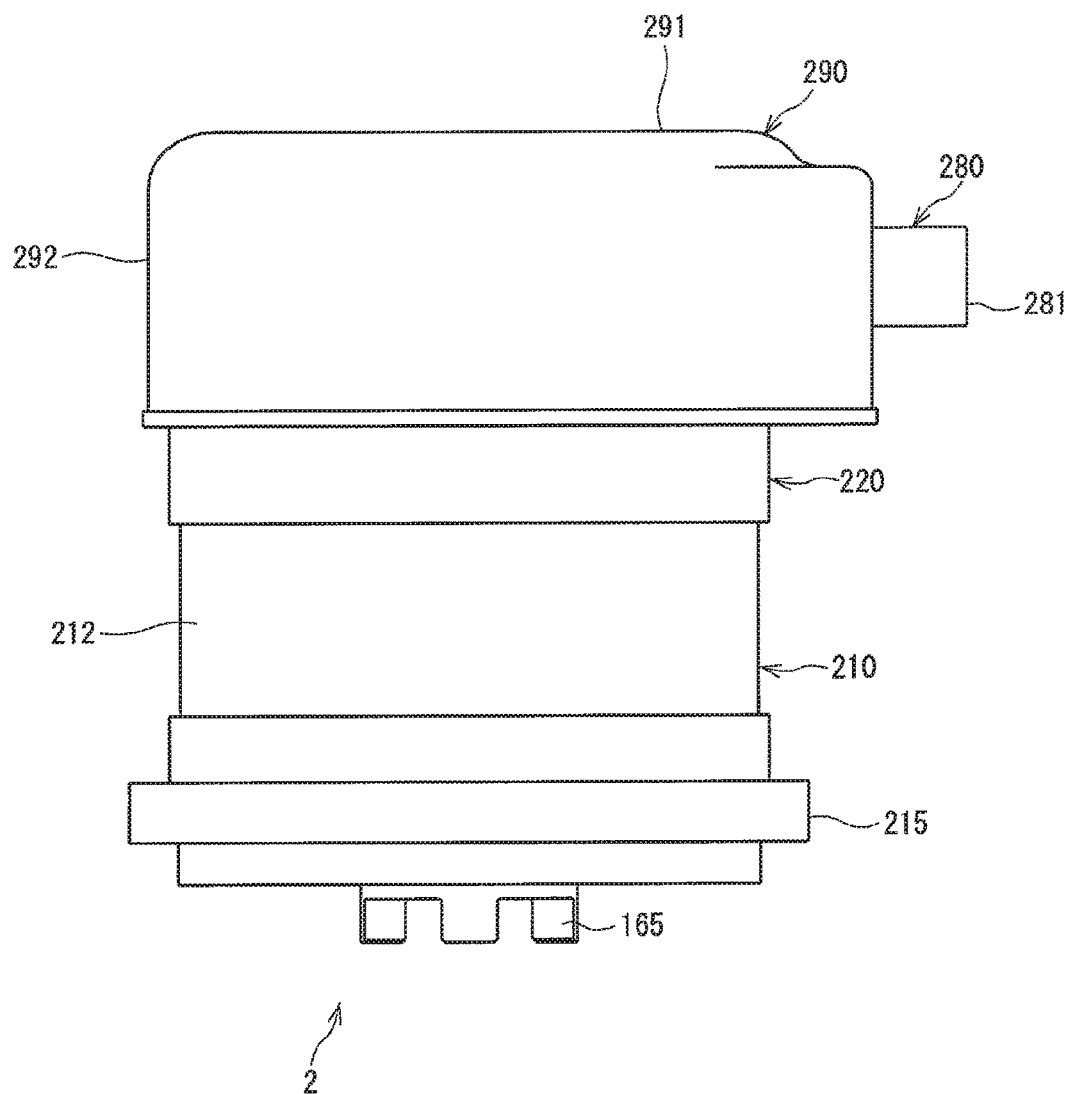
FIG. 15 is a side view of the drive device in the second embodiment of the present disclosure.
Figure 16:
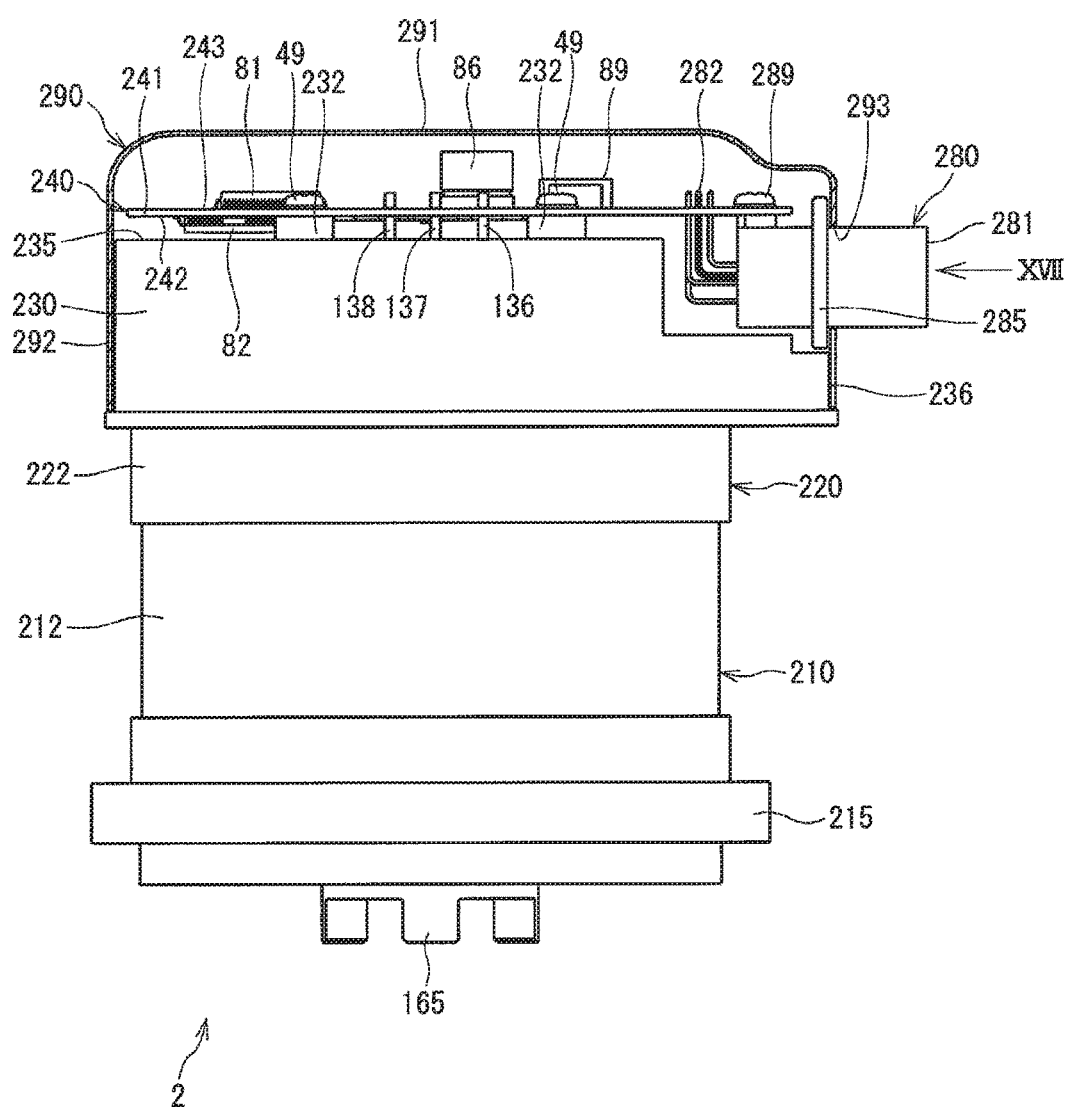
FIG. 16 is a side view of the drive device in which a cover member in FIG. 15 is partially removed.
Figure 17:
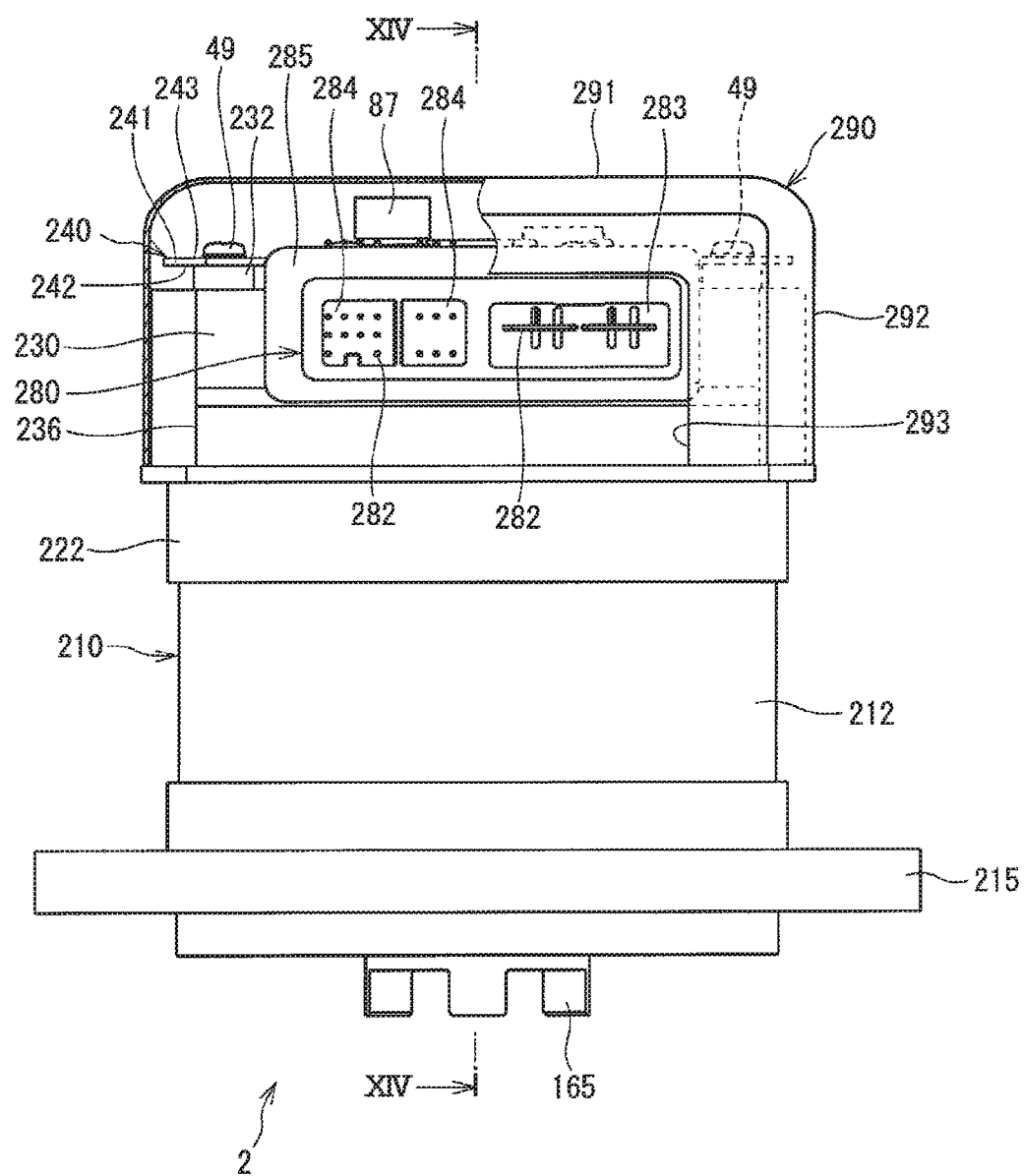
FIG. 17 is a side view of the drive device along an arrow XVII in which the cover member in FIG. 15 is partially removed.

The drive device in the second embodiment of the present embodiment is shown in FIGS. 14-19. FIG. 14 is a sectional view along a XIV-XIV line in FIG. 17.

A drive device 2 is provided with a motor 210 serving as a rotating electric machine, a front frame end 215, a rear frame end 220, an ECU 240 serving as a controller, a connector 280, a cover member 290 and the like. In the present embodiment, the rear frame end 220 corresponds to a "frame member." The electric configuration of the drive device 2 is the same as that of the above-mentioned embodiment, thereby no repetitive description is provided.

The motor 210 is provided with a stator 212, the rotor 15, the shaft 16 as shown in FIG. 14, together with other parts.

The stator 212 has the front frame end 215 and the rear frame end 220 fixed thereon. In the present embodiment, a motor case is not provided, and the stator 212 is exposed. Other features other than the above are the same as that of the stator 12 of the above-mentioned embodiment. That is, in the drive device 2 of the present embodiment, the stator 212 is exposed, and does not have a waterproof structure. Therefore, the drive device 2 of the present embodiment is preferably disposed in a vehicle compartment rather than in an engine room, and is preferably applicable to a column assist type electric power steering device.

In the present embodiment, since the motor case is omitted, the "motor region" is considered as a projection silhouette of the stator 212.

The front frame end 215 is made with, for example, metal, e.g. aluminum or the like, and is provided on the opposite end of the motor 210 relative to the ECU 240. The front frame end 215 has a shaft hole 216 bored substantially at the center thereof. The bearing 166 is attached to the front frame end 215, and one end 161 of the shaft 16 is inserted thereinto. The one end 161 of the shaft 16 is exposed from the front frame end 215. The one end 161 of the shaft 16 is provided with an output end 165. The output end 165 is connected to the speed reduction gear 9. Thereby, the torque generated by the rotation of the rotor 15 and the shaft 16 is output to the column shaft 102 via the speed reduction gear 9.

As shown in FIGS. 14-17, the rear frame end 220 has a frame part 222, a heat dissipater 230, and a connector receiver 236, for example, and is made with thermally-conductive metal, (e.g., aluminum or the like) and is disposed on the ECU 240 side of the motor 210. The front frame end 215 and the rear frame end 220 are combined by using a through bolt (not illustrated), with the motor 210 interposed therebetween. Further, the rear frame end 220 has motor line insertion holes bored thereon (not illustrated). The motor lines 135 and 145 are inserted into the motor line insertion holes, and are taken out to extend toward the ECU 240.

The frame part 222 has a ring shape, and is attached to the stator 212 of the motor 210.

The heat dissipater 230 stands on the frame part 222 to extend toward the ECU 240. The heat dissipater 230 has a circuit board fixing part 232. A surface of the heat dissipater 230 facing the ECU 240 is formed as a radiation surface 235.

A shaft hole 231 is bored at a position of the center axis O on the heat dissipater 230. The shaft hole 231 has a bearing 167 disposed therein, and an other end 162 of the shaft 16 is inserted thereinto. Thereby, the magnet 18 provided on the other end 162 of the shaft 16 is exposed to the ECU 240.

The connector receiver 236 protrudes from the heat dissipater 230 toward a radius outside thereof. Next to the connector receiver 236, a connector 280 is disposed on the ECU 240 side. The connector receiver 236 and the connector 280 are separated with a gap in between.

In the present embodiment, the thickness of the heat dissipater 230 along the axial direction at a position on the ECU 240 side of the connector receiver 236 is measured as the required thickness d.

The ECU 240 is disposed on an opposite side of the rear frame end 220 relative to the motor 210, and is positioned substantially co-axially with the motor 210.

The ECU 240 has a circuit board 241 on which various electronic components are mounted.

The circuit board 241 takes a shape that fits in the projection region of the rear frame end 220. Further, the components of the ECU 240, (i.e., the SW elements 51-56, 61-66, the current detection elements 57-59, 67-69, the capacitors 86, 87, and the choke coil 89) which are mounted on the circuit board 241, are arranged in the motor region.

Here, a motor side surface of the circuit board 241, which faces the motor 210, is designated as a heat generation element mount surface 242, and an opposite surface of the circuit board 241, which faces away from the motor 210, is designated as a large-size component mount surface 243. In the present embodiment, the heat generation element mount surface 242 corresponds to a "first surface", and the large-size component mount surface 243 corresponds to a "second surface."

Figure 18:
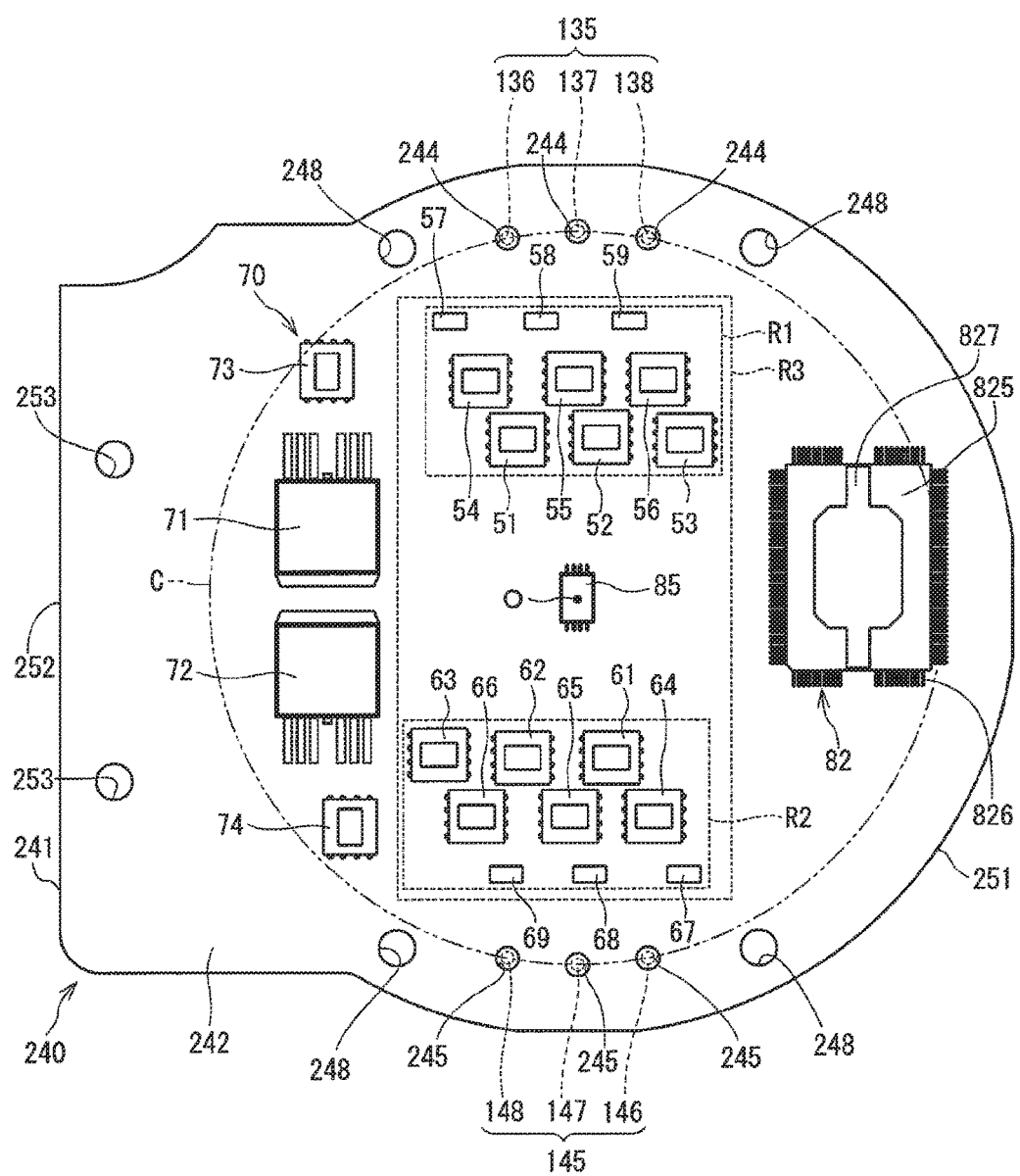
FIG. 18 is a plan view of a frame member side of a substrate in the second embodiment of the present disclosure.
Figure 19:
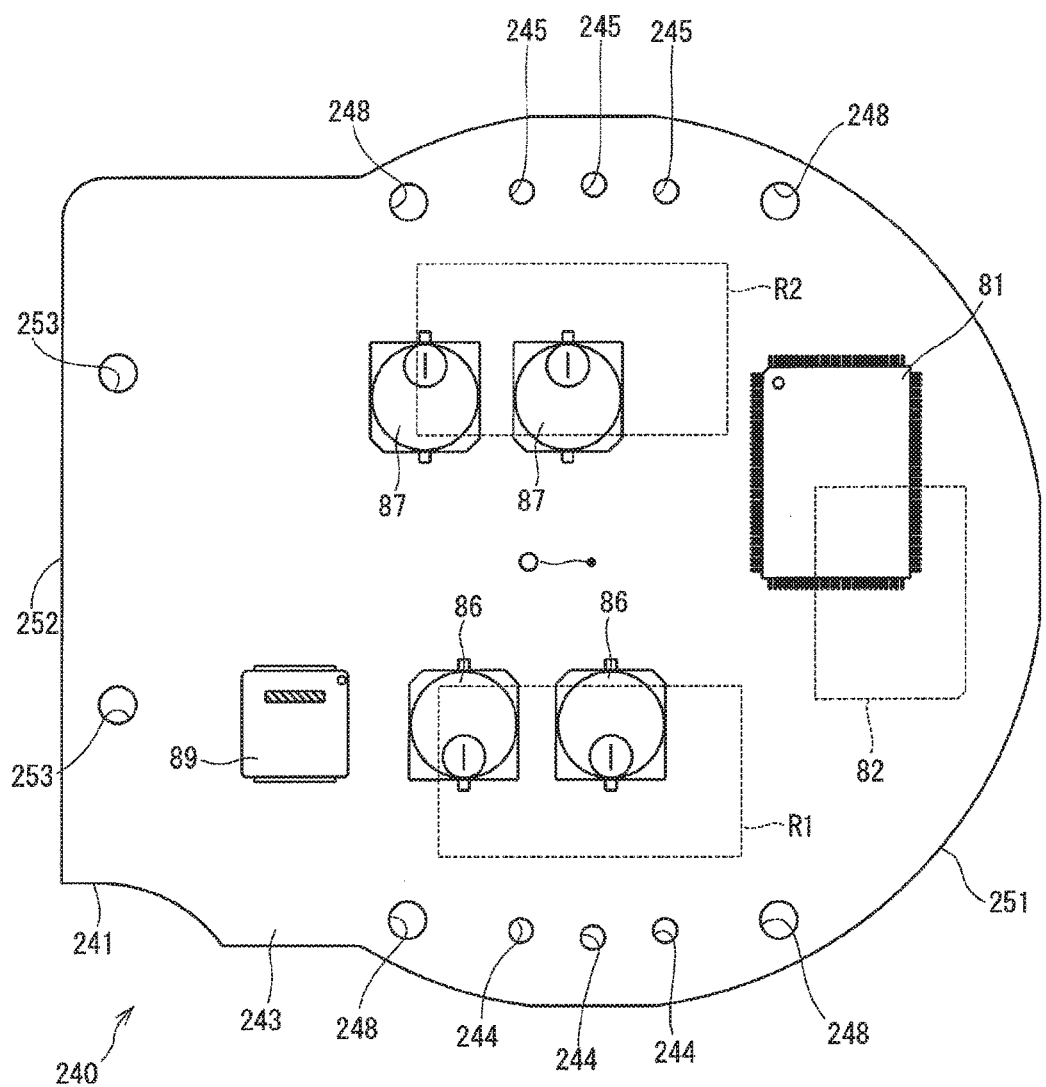
FIG. 19 is a plan view of an opposite side of the substrate in the second embodiment of the present disclosure.

As shown in FIG. 18, the heat generation element mount surface 242 has the SW elements 51-56, 61-66, the current detection elements 57-59, the power relays 71, 72, the reverse connection protection relays 73, 74, the ASIC 82, the rotational angle sensor 85 and the like mounted thereon.

In the present embodiment, the SW elements 51-56 61-66, the current detection elements 57-59, 67-69, the power relays 71, 72, the reverse connection protection relays 73, 74, and the ASIC 82 respectively contact the radiation surface 235 of the heat dissipater 230 of the rear frame end 220 via the heat dissipation gel in a heat dissipatable manner. Thereby, heat generated by the SW elements 51-56, 61-66, the power relays 71, 72, the reverse connection protection relays 73, 74, and the ASIC 82 is dissipated to the rear frame end 220 via the heat dissipation gel.

Since the ASIC 82 is mounted on the heat generation element mount surface 242 of the circuit board 241 in a heat dissipatable manner to dissipate heat to the heat dissipater 230, the electric components are mountable in an overlapping region on the large-size component mount surface 243, which overlaps the mounting area of the ASIC 82. In the present embodiment, on the large-size component mount surface 243, the microcomputer 81 is mounted in a region which at least partially overlaps with the ASIC 82, (refer to FIG. 14 and FIG. 19), similarly to the above-mentioned embodiment.

In the present embodiment, the SW elements 51-56 serving as the first inverter part 50 and the SW elements 61-66 serving as the second inverter part 60 are symmetrically arranged on the center axis O of the motor 10 (i.e., a position where the rotational angle sensor 85 is disposed in the present embodiment). In the present embodiment, the SW elements 51-56 and the SW elements 61-66 are arranged on the center axis O of the motor 10 in a point-symmetric manner. Further, on the circuit board 241, the on-board wiring in the first region R1 and the on-board wiring in the second region R2 are point-symmetric on the center axis O.

In addition, the phase sequence is arranged in the same manner as the above-mentioned embodiment, (i.e., U, V, W phases in order from the power relay 71 side in the first inverter part 50, and the W, V, U phases in order from the relay 72 side in the second inverter part 60).

The arrangement and other matter not mentioned above regarding the electronic components on the substrate 241 are also the same as the above-mentioned embodiment.

A motor line insertion section 244 is bored at a radius outside position outer than the first region R1 where the elements serving as the first inverter part 50 on the circuit board 241 are mounted. The first motor line 135 is inserted into the motor line insertion section 244, and is connected to the section 244 by solder or the like.

A motor line insertion section 245 is bored at a radius outside position outer than the second region R2 where the elements serving as the second inverter part 60 on the circuit board 241 are mounted. The second motor line 145 is inserted into the motor line insertion section 245, and is connected to the section 245 by solder or the like.

The motor line insertion sections 244 and 245 are positioned on a circle C that is centered on the center axis O. That is, the motor lines 135 and 145 are arranged on the circle C on the circuit board 241. In the present embodiment, the motor lines 135 and 145 are taken out respectively as a winding wire of the winding groups 13 and 14, which is wound on the stator 212 having a ring shape. By arranging the motor line insertion sections 244 and 245 on the same circle, the motor lines 135 and 145 extend straight from the stator 212 toward the circuit board 41, thereby making it easy for the motor lines 135 and 145 to be connected to the circuit board 241.

Further, according to the above configuration, the resistance of the wiring to the inverter parts 50, 60 is reduced, and the balance between the wirings among the two inverter parts 50, 60 is maintained (i.e., the difference of impedances between the two wirings is controlled to be small) by design with the ease of connection of those wirings to the circuit board 41, for realizing a smooth motor drive control which has only a little torque ripple.

A hole 248 is bored at a position corresponding to the circuit board fixing part 232 of the circuit board 241. A circuit board lockscrew 49 is inserted into the hole 248, and is screwed onto the circuit board fixing part 232 of the rear frame end 220. Thereby, the circuit board 241 is fixed onto the rear frame end 220.

The circuit board 241 has an arc part 251 having an arc shape and a connector fixing part 252 disposed on a radius outside of the arc part 251. The connector fixing part 252 has a hole 253 bored thereon into which a connector lockscrew 289 is inserted.

The connector fixing part 252 is positioned outside of the power relays 71, 72 and the reverse connection protection relays 73, 74 on the heat generation element mount surface 242 of the circuit board 241, and the connector 280 is positioned on the connector fixing part 252.

As shown in FIGS. 14-17, the connector 280 is fixed onto the circuit board 241 by the connector lockscrew 289 inserted from the large-size component mount surface 243 side of the circuit board 241.

The connector 280 is made from resin or similar material, is disposed to protrude radially outwardly from the circuit board 241, and is positioned on the ECU 240 side facing the rear frame end 220 within proximity of the connector receiver 236 (i.e., the connector 280 is positioned between the rear frame end 220 and the ECU 240). In other words, the connector 280 is positioned on the ECU 240 side of the frame part 222, near the connector receiver 236 of the rear frame end 220, and more closely describes how the connector 280 is positioned on the controller side of the frame member.

In the present embodiment, the connector 280 is positioned on the heat generation element mount surface 242 side of the circuit board 241, which is beneficial for heat dissipation, because the heat dissipater 230 can rise up from the rear frame end 220 by the height of the connector 280, reserving an increased size for a heat dissipation surface and increasing a heat mass dissipated therefrom. That is, heat generated by the heat generation element 70 is may be efficiently dissipated from the heat dissipater 230.

An opening 281 of the connector 280 faces outward, and is connectable to a harness incoming from radius outside of the drive device 2. Further, the connector 280 has a terminal 282. The terminal 282 is connected to the circuit board 241.

The connector 280 of the present embodiment has a power supply connector 283 and a signal connector 284, which are integrally formed to have one body. The outer periphery of the connector 280 has a flange 285 formed thereon.

A cover member 290 is made from metallic material, and is formed to have a separate body from the connector 280. The cover member 290 has a top part 291 and a side wall 292 formed along the periphery of the top part 291, and covers the ECU 240, and is fixed onto the rear frame end 220 by caulking or the like.

The side wall 292 has a notch 293 suitably formed to accommodate the connector 280. The opening 281 side of the connector 280 is thus exposed from the cover member 290.

In the present embodiment, the flange 285 has a motor side face exposed from the cover member 290, based on an assumption that the motor 10 is positioned on a vertically-lower side in the drive device 2 after installation into the vehicle. By having the flange 285, water or the like is prevented from intruding into the inside of the drive device 2 via a connection part between the cover member 290 and the connector 280. Further, water permeated in the inside is transported toward an outside of the drive device 2 along the flange 285.

In the present embodiment, at a position of the center axis O of the circuit board 241, the rotational angle sensor 85 is disposed. The SW elements 51-56, 61-66 serving as the first inverter part 50 and the SW elements 61-66 serving as the second inverter part 60 are point-symmetrically arranged on the center axis O. More specifically, by the point-symmetric arrangement of the phase sequences in those inverter parts which cancels the spill of the magnetic flux from each of the two inverter parts, the detection error of the rotational angle sensor 85 is reduced.

Further, the on-board wiring in the first region R1 and the on-board wiring in the second region R2 are point-symmetric on the center axis O. In such manner, the length of the wiring is reduced, thereby reducing the impedance of the wiring. More specifically, by the point-symmetric arrangement of the phase sequences, the variation of the wiring lengths among different phases is reduced and the variation of the impedance among the different wirings is reduced.

The configuration of the present embodiment also achieves the same effects as the earlier-mentioned embodiment.

(Other Embodiments)

(a) Frame Member

According to other embodiments other than the above, the frame member may be fixed onto the motor case, or the frame member may be fixed onto the motor case by using a component other than a screw. Further, the frame member may be fixed onto the motor case by press-fitting. In such manner, the number of components may be reduced. Further, the volume along the radius of the drive device may be reduced.

According to the above-mentioned embodiments, the frame member is disposed on one axial end of the rotating electric machine, which is an opposite side to the output end. According to other embodiments, the frame member may be disposed on an output end side. Further, the frame member may be disposed at a radius outside position or the like, i.e., at a position other than the one axial end of the rotating electric machine.

According to the above-mentioned embodiment, based on an assumption that the circuit board is disposed substantially coaxially with the rotating electric machine, the center axis O is considered as a center point of the drive device. According to other embodiments, if the circuit board is disposed non-coaxially with the rotating electric machine, or if the circuit board is fixed onto the frame member that is disposed at a position other than the one axial end of the rotating electric machine, a position other than the center axis O (e.g., a center point of the circuit board) may be set as a center point of the drive device.

According to the above-mentioned embodiment, the frame member serves as an outer shell of the rotating electric machine. According to other embodiments, the frame member may be provided as a separate member from an outer shell member for providing an outer shell for the rotating electric machine, and the frame member may be fixed onto the outer shell member.

According to the above-mentioned embodiment, the frame member bears the circuit board fixed onto a facing-away side relative to the rotating electric machine. According to other embodiments, the frame member may have the circuit board fixed onto a rotating electric machine facing side thereof.

(b) ECU

According to the above-mentioned embodiments, the inverter part and the relay are respectively provided in two sets. According to other embodiments, the inverter part and the relay may be respectively provided in three sets or more.

According to the above-mentioned embodiments, the heat generation element may contact the frame member via the heat dissipation gel in a heat dissipatable manner. According to other embodiments, the heat dissipation gel may be replaced with a heat dissipation sheet, or the heat generation element and the frame member may contact directly.

According to the above-mentioned embodiments, the SW elements have the heat dissipation slug exposed from the mold part. According to other embodiments, the heat dissipation slug may be not necessarily exposed from the SW element.

According to the above-mentioned embodiments, the exposure portion of the heat dissipation slug is considered as "a heat dissipating portion". However, in case that the heat dissipation slug is not exposed, the entire mold part may be considered as "a heat dissipating portion", for example.

The same applies to the power relay, the reverse connection protection relay, and the ASIC.

According to the above-mentioned embodiments, the drive element, the current detection element, the power relay, the reverse connection protection relay, and the ASIC correspond to the heat generation element, and these heat generation elements are disposed to dissipate heat from their backs to the frame member. According to other embodiments, the current detection element, the power relay, and the reverse connection protection relay may be mounted on the large-size component mount surface, or may be omitted.

Further, the current detection element may be implemented not as the shunt resistor, but as a Hall IC etc., and the current detection element may only be provided for two phases or less. That is, the current detection element may be partially omitted. The power relay may be implemented as a mechanical relay. When the current detection element is implemented as a Hall IC or the like, which has no need to dissipate heat therefrom, the current detection element may be disposed not in contact with the frame member, i.e., may be configured not to dissipate heat to the frame member.

Further, electronic components other than the above may also be mounted on the heat generation element mount surface of the circuit board as heat generation elements, to be enabled to dissipate heat from their backs toward the frame member.

According to the above-mentioned embodiments, the SW element serving as the first inverter part and the SW element serving as the second inverter part are arranged axi-symmetric in the first embodiment, and the SW element serving as the first inverter part and the SW element serving as the second inverter part are arranged point-symmetric in the second embodiment.

According to other embodiments, the SW elements having the first embodiment configuration may have a point symmetry arrangement, or the SW element having the second embodiment configuration may have an axial symmetry arrangement.

Further, the SW element may also be arranged arbitrarily (i.e., not necessarily be in a symmetrical arrangement).

Further, the electronic components other than the SW element may also be arranged arbitrarily.

Further, according to the above-mentioned embodiments, the phase sequence in the first system is U, V, W from the near side of the power relay, and the phase sequence in the second system is W, V, U from the near side of the power relay. According to other embodiments, the phase sequence in the first system may be arbitrarily ordered (i.e., not necessarily be U, V, W order from the power relay side). Further, the phase sequence in the second system may preferably be the reverse order of the first system. In such manner, the magnetic flux leakage from the rotational angle sensor is reduced, just like the above-mentioned embodiment. Further, the variation of the wiring impedance among the different phases is reduced. Further, the phase sequences in the first and second systems may be not necessarily reversed.

According to the above-mentioned embodiments, the controller component includes the calculation circuit, the pre-driver, the regulator, the signal processor, and the rotational angle sensor. According to other embodiments, some of the controller components may be disposed on other circuit board that is different from the circuit board having the drive element mounted thereon, or some of the controller components may be omitted.

According to the above-mentioned embodiments, the ASIC is mounted on the heat generation element mount surface in a heat dissipatable manner to dissipate heat to the frame member. According to other embodiments, the controller component other than the ASIC (e.g., a microcomputer) may be disposed on the heat generation element mount surface in a heat dissipatable manner to dissipate heat to the frame member. In such case, the microcomputer corresponds to "a heat generation element."

According to the above-mentioned embodiments, the ASIC includes the pre-driver, the signal processor, and the regulator. According to other embodiments, the ASIC includes at least one of the pre-driver, the signal processor, and the regulator. Further, one or more of the pre-driver, the signal processor, and the regulator may be provided as a separate component. Further, the ASIC may include a communication device for performing communication with other device and other device, beside including at least one of the pre-driver, the signal processor, and the regulator.

According to the above-mentioned embodiments, in the overlapping area on the opposite surface, i.e., the surface facing away from the rotating electric machine, which at least partially overlapping with the integrated circuit components mounting region, the microcomputer is mounted. According to other embodiments, in the overlapping area on the opposite surface, (i.e., the surface facing away from the rotating electric machine) which at least partially overlapping with the integrated circuit components mounting region, electronic components other than the microcomputer may be mounted. That is, in such an area, the capacitors or the like may be mounted.

According to the first embodiment, the metal piece used for connection to the motor line is mounted on the circuit board, and the circuit board and the motor line are connected by press-fitting. Further, in the second embodiment, the circuit board and the motor line are connected by solder or the like.

According to other embodiments, the circuit board and the motor line in the first embodiment configuration may be connected by solder, or the circuit board and the motor line in the second embodiment configuration may be connected by press-fitting the metal piece that is disposed on the circuit board, for example. Further, the connection between the circuit board and the motor line may be made not only by press-fitting or solder but also by any other method.

According to the above-mentioned embodiments, the circuit board is fixed onto the frame member by using the circuit board lockscrew. In other embodiments, the circuit board may be fixed onto the frame member not only by using a screw but by any other method.

(c) Connector

According to the first embodiment, the connector comprises one power supply connector and two signal connectors. According to other embodiments, one of the above or both connectors may be provided two sets or more. Those connectors may have separate bodies as in the first embodiment, or may have an integrated body as in the second embodiment.

Further, the number of connectors, the orientation of the opening of the connector, and the cover member arrangement as to having one body with the connector or not, may all be arbitrarily combined.

(d) Cover Member

According to the first embodiment, the cover member is fixed onto the frame member with adhesives. According to the second embodiment, the cover member is caulked to the frame member. The cover member may be fixed onto the frame member by any other method such as fixing by using a screw or the like.

(e) Drive Device

According to the above-mentioned embodiments, the rotating electric machine is a three-phase brushless motor. According to other embodiments, the motor may be any kind (i.e., not necessarily the three-phase brushless motor).

Further, the rotating electric machine may not be only a motor (i.e., an electric motor) but a generator, and may also be a motor-generator having a motor function and a generator function. Further, the winding may be formed not only in two systems, but also in three systems.

According to the above-mentioned embodiments, the drive device is applied to an electric power steering device. According to other embodiments, the drive device may be applied to a device other than the electric power steering device.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive device comprising:
   a rotating electric machine having a case, a stator housed within the case and comprising a winding wound on the stator, a rotor rotatably disposed relative to the stator, and a shaft configured to rotate together with the rotor;
   a magnet disposed at a tip of the shaft and configured to generate a rotating magnetic field;
   a rotation angle sensor configured to detect a rotation angle of the rotor by detecting the rotating magnetic field;
   a frame member fixed to the case, the frame member positioned on one axial end of the rotating electric machine and rotatably supporting the rotor, the one axial end being on an opposite side of the rotating electric machine relative to an output end that is connected to the shaft to output a drive force of the rotating electric machine;
   a circuit board fixed on one side of the frame member that is an opposite side of the frame member relative to another side of the frame member where the rotating electric machine is located, the circuit board having a first surface facing the frame member and a second surface opposite the first surface;
   an inverter connected to the first surface of the circuit board, the inverter configured to switch ON and OFF a supply of an electric current to the winding;
   a large-size component disposed on the second surface of the circuit board; and
   a cover member configured to connect to the frame member and to cover the second surface of the circuit board, the cover member having
   a room protruding axially away from the cover member and the rotating electric machine, the room configured to accommodate and cover the large-size component on the second surface of the circuit board; and
   a plurality of connectors protruding axially away from the cover member and the rotating electric machine, wherein
   the room is disposed centrally relative to the connectors on the cover member.

2. The drive device of claim 1, wherein
   the room is disposed at a center of the cover body.

3. The drive device of claim 1, wherein
   the room has a hole disposed thereon, the hole configured to maintain a constant pressure within the drive device, and wherein
   the drive device includes a filter member, the filter member configured to
   attach to the cover member and cover the hole,
   pass air through the hole, and
   block a passage of water through the hole.

4. The drive device of claim 1, wherein
   the rotation angle sensor is disposed at a center position on the first surface of the circuit board.

5. The drive device of claim 1, wherein
   the large-size component is at least one of a capacitor and a choke coil.

6. The drive device of claim 1, wherein the drive device includes
   a motor line extending from the winding; and
   a motor line connector configured to receive the motor line, the motor line connector disposed on a periphery of the second surface of the circuit board, wherein
   the large-size component is disposed centrally on the second surface of the circuit board relative to the motor line connector.

* * * * *